(12) United States Patent
Matsuda et al.

(10) Patent No.: US 12,287,500 B2
(45) Date of Patent: Apr. 29, 2025

(54) OPTICAL FILTER, METHOD FOR MANUFACTURING SAME, AND OPTICAL MODULE

(71) Applicant: NITTO DENKO CORPORATION, Osaka (JP)

(72) Inventors: Tomoya Matsuda, Osaka (JP); Yudai Numata, Osaka (JP); Masato Katsuda, Osaka (JP); Shoichi Matsuda, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 142 days.

(21) Appl. No.: 17/911,902

(22) PCT Filed: Mar. 15, 2021

(86) PCT No.: PCT/JP2021/010417
§ 371 (c)(1),
(2) Date: Sep. 15, 2022

(87) PCT Pub. No.: WO2021/187434
PCT Pub. Date: Sep. 23, 2021

(65) Prior Publication Data
US 2023/0129841 A1    Apr. 27, 2023

(30) Foreign Application Priority Data

Mar. 16, 2020   (JP) ................. 2020-045671
Sep. 29, 2020   (JP) ................. 2020-163409

(51) Int. Cl.
*G02B 5/20* (2006.01)
*G02B 5/02* (2006.01)

(52) U.S. Cl.
CPC ........... *G02B 5/206* (2013.01); *G02B 5/0242* (2013.01); *G02B 5/208* (2013.01)

(58) Field of Classification Search
CPC ........ G02B 5/206; G02B 5/20; G02B 5/0242; G02B 5/0236; G02B 5/02; G02B 5/0205; G02B 5/0278; G02B 5/0294; G02B 5/208
See application file for complete search history.

(56) References Cited

U.S. PATENT DOCUMENTS

2008/0316594 A1    12/2008  Hashiguchi et al.
2016/0231470 A1*   8/2016   Ishimori .............. G02B 5/0242
(Continued)

FOREIGN PATENT DOCUMENTS

JP    2006-165493    6/2006
JP    2010-58091     3/2010
(Continued)

OTHER PUBLICATIONS

M. Iwata et al., "Bio-Inspired Bright Structurally Colored Colloidal Amorphous Array Enhanced by Controlling Thickness and Black Background", Adv. Meter. 2017, 29, 1605050 (17 pages).
(Continued)

*Primary Examiner* — Stephone B Allen
*Assistant Examiner* — Adam W Booher
(74) *Attorney, Agent, or Firm* — GREENBLUM & BERNSTEIN, P.L.C.

(57) ABSTRACT

An optical filter (10) comprises a matrix (12) and fine particles (14) dispersed in the matrix (12), wherein the fine particles (14) have a parameter Ds of 8.0 to 30 inclusive, Ds being determined by a USAXS pattern and given by $Ds=\lambda/(B \cdot \cos\theta \cdot Ra)$, where $\lambda$ is the X-ray wavelength, $\theta$ is one half the scattering angle $2\theta$(rad) providing a scattering intensity peak, B is the half width (FWHM, rad) of the peak, and Ra is the average particle size of the fine particles (14).

17 Claims, 16 Drawing Sheets

(56) References Cited

U.S. PATENT DOCUMENTS

| | | | |
|---|---|---|---|
| 2018/0003872 A1 | 1/2018 | Kubo et al. | |
| 2019/0176434 A1* | 6/2019 | Sugawara | H10K 59/65 |
| 2019/0377111 A1* | 12/2019 | Taguchi | G02B 5/201 |
| 2019/0391307 A1 | 12/2019 | Wheatley et al. | |
| 2019/0391311 A1 | 12/2019 | Nevitt et al. | |
| 2022/0120948 A1* | 4/2022 | Shigitani | G02B 5/206 |

FOREIGN PATENT DOCUMENTS

| | | |
|---|---|---|
| JP | 2010-72616 | 4/2010 |
| JP | 2013-65052 | 4/2013 |
| JP | 5274164 | 8/2013 |
| TW | 201938698 | 10/2019 |
| TW | 201940903 | 10/2019 |
| WO | 2018/160866 | 9/2018 |

OTHER PUBLICATIONS

International Search Report issued in International Patent Application No. PCT/JP2021/010417, dated May 18, 2021, along with an English translation thereof.

Written Opinion issued in International Patent Application No. PCT/JP2021/010417, dated May 18, 2021, along with an English translation thereof.

Japan, Notice of Reasons for Refusal received in Japanese Patent Application No. 2022-508354, dated Aug. 6, 2024.

Extended European search report received in EP Application No. 21771354.4, dated Jun. 14, 2024.

* cited by examiner

COMPARATIVE EXAMPLE 3

EXAMPLE 12

COMPARATIVE EXAMPLE 4

1μm

2μm

OPTICAL FILTER, METHOD FOR MANUFACTURING SAME, AND OPTICAL MODULE

TECHNICAL FIELD

The present invention relates to an optical filter, a method for producing the same, and an optical module; for example, an optical filter preferably usable as an infrared filter having a high infrared regular transmittance and a high visible light diffuse reflectance, a method for producing the same, and an optical module including a device and such an optical filter provided at a front surface of an infrared receiver of the device, the device being, for example, a sensing device or a communication device.

BACKGROUND ART

Senser technologies and communication technologies using infrared rays have been developed and put into practice. Elements that receive infrared rays are generally sensitive also to visible light. Therefore, an infrared-transmissive filter that selectively transmits only infrared rays is used. The definition of the "infrared rays" varies in accordance with the technological art. In this specification, the term "infrared rays" refers to light that includes at least light (electromagnetic waves) having a wavelength in the range not shorter than 760 nm and not longer than 2000 nm and that is used for sensing or communication. The "visible light" refers to light having a wavelength in the range not shorter than 400 nm and shorter than 760 nm.

Conventional mainstream infrared-transmissive filters exhibit a black color to absorb visible light, and therefore, have a problem of being poor in terms of design quality.

Patent Document 1 discloses an infrared receiver/transmitter including a dielectric multi-layer film transmitting infrared rays and reflecting and transmitting visible light and having a matte-finished surface. Patent Document 2 discloses an optical item for infrared communication that exhibits a white color and has an infrared transmittance of 12% or higher. In order to allow the optical item to exhibit a white color, a surface of a transparent substrate is roughened to form a microscopic concaved and convexed pattern, and visible light is scattered by Rayleigh scattering provided by the microscopic concaved and convexed pattern.

CITATION LIST

Patent Literature

Patent Document 1: Japanese Laid-Open Patent Publication No. 2006-165493 (Japanese Patent No. 4122010)
Patent Document 2: Japanese Laid-Open Patent Publication No. 2013-65052 (Japanese Patent No. 5756962)
Patent Document 3: Japanese Laid-Open Patent Publication No. 2010-058091 (Japanese Patent No. 5274164)

Non-Patent Literature

Non-patent literature 1: M. Iwata et al., "Bio-Inspired Bright Structurally Colored Colloidal Amorphous Array Enhanced by Controlling Thickness and Black Background", Adv. Meter., 2017, 29, 1605050

SUMMARY OF INVENTION

Technical Problem

The infrared receiver/transmitter described in Patent Document 1 colors an external surface thereof only with the visible light reflected by the dielectric multi-layer film. Therefore, the color varies in accordance with the angle at which the infrared receiver/transmitter is viewed. There is also a problem that the dielectric multi-layer film is costly.

According to studies made by the present inventors, the following has been found out regarding a film for infrared communication using such a dielectric multi-layer film as described in Patent Document 1. In the case where a motion of a hand is captured by an infrared camera through such a film, the contour of the hand is blurred, and thus it is difficult to use the film for motion capturing. A conceivable reason for this is that the film has a low infrared regular transmittance.

For example, Patent Document 3 and Non-patent Document 1 each disclose that a fine-particle dispersion having an amorphous structure or a colloidal amorphous array expresses a bright structural color (e.g., blue) with small angle dependence. Patent Document 3 describes that a fine-particle dispersion having an amorphous structure is especially useful for a use in which light of a specific wavelength is reflected (e.g., for a color material, an infrared-reflective film, etc.).

The present invention made to solve the above-described problems has an object of providing an optical filter that has a novel structure and is preferably usable as an infrared-transmissive filter exhibiting a white color and having a high infrared regular transmittance, a method for producing the same, and an optical module.

Solution to Problem

Embodiments of the present invention provide the following solution to the problem.

[Item 1]

An optical filter, comprising:

a matrix and fine particles dispersed in the matrix, wherein the fine particles have a parameter Ds that is not smaller than 8.0 and not larger than 30, the parameter Ds being given by $Ds=\lambda/(B \cdot \cos\theta \cdot Ra)$ found from a USAXS pattern, where $\lambda$ is the wavelength of a X-ray, $\theta$ is half of the scattering angle $2\theta$ (rad) giving the peak of the scattering intensity, B is the half width of the peak (FWHM, rad), and Ra is the average particle diameter of the fine particles.

[Item 2]

The optical filter of item 1, wherein the optical filter exhibits a white color.

[Item 3]

The optical filter of item 1 or 2, wherein a color exhibited in the case where standard light from a D65 light source is used has x and y coordinates in ranges of $0.25 \leq x \leq 0.40$ and $0.25 \leq y \leq 0.40$ on a CIE 1931 chromaticity diagram.

[Item 4]

The optical filter of any one of items 1 through 3, wherein the optical filter has a value of L* measured by an SCE method of 20 or larger.

[Item 5]

The optical filter of any one of items 1 through 4, wherein the optical filter has a regular transmittance of 60% of higher for light having a wavelength in at least a part of a wavelength range not shorter than 760 nm and not longer 2000 nm.

[Item 6]

The optical filter of item 5, wherein the regular transmittance for light having a wavelength of 950 nm is 60% or higher.

[Item 7]

The optical filter of item 5 or 6, wherein the regular transmittance for light having a wavelength of 1500 nm is 60% or higher.

[Item 8]

The optical filter of any one of items 1 through 7, wherein the fine particles include mono-dispersed first fine particles having an average particle diameter in a range not shorter than 80 nm and not longer than 300 nm.

[Item 9]

The optical filter of item 8, wherein the first fine particles have an average particle diameter of 150 nm or longer.

[Item 10]

The optical filter of any one of items 1 through 9, wherein the fine particles form at least a colloidal amorphous array.

[Item 11]

The optical filter of any one of items 1 through 10, wherein the fine particles has a volume fraction not lower than 6% and not higher than 60%.

[Item 12]

The optical filter of any one of items 1 through 11, wherein where the matrix has a refractive index of $n_M$ and the fine particles have a refractive index of $n_P$, both for light having a wavelength of 546 nm, $|n_M - n_P|$ is not smaller than 0.03 and not larger than 0.6.

[Item 13]

The optical filter of any one of items 1 through 12, wherein the optical filter has a three-dimensional shape.

[Item 14]

The optical filter of any one of items 1 through 13, wherein the matrix is formed of a resin, and the fine particles are formed of an inorganic material.

[Item 15]

A method for producing the optical filter of item 14, the method comprising the steps of:

preparing a curable resin composition containing the fine particles dispersed and mixed in a curable resin;

providing a surface of a substrate with the curable resin composition, and curing the curable resin contained in the curable resin composition provided on the surface.

[Item 16]

The method of item 15, wherein the step of providing is performed by a coating method.

[Item 17]

The method of item 16, wherein the step of providing is performed by a dip coating method.

[Item 18]

An optical module, comprising:

a device including an infrared receiver; and the optical filter of any one of items 1 through 13 located on a front surface of the infrared receiver of the device.

[Item 19]

The optical module of item 18, wherein the device is a sensing device, a communication device, a solar cell, a heater or a power supply device.

Advantageous Effects of Invention

An optical filter having a novel structure according to an embodiment of the present invention is preferably usable as an infrared-transmissive filter exhibiting a white color and having a high infrared regular transmittance. Embodiments of the present invention provide a method for producing such an optical filter and an optical module including such an optical filter.

DESCRIPTION OF EMBODIMENTS

Figure 1:
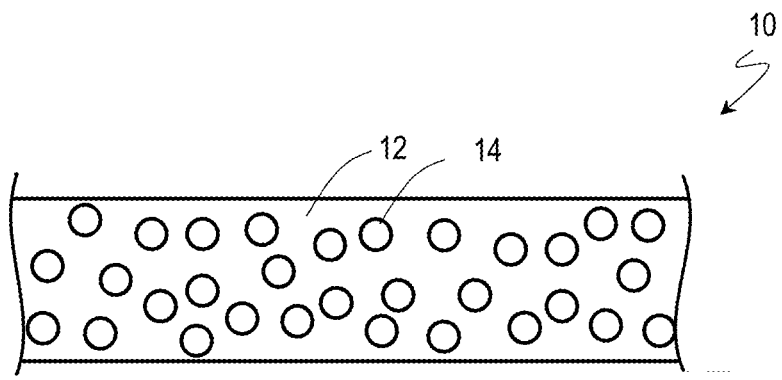
FIG. 1 is a schematic cross-sectional view of an optical filter 10 according to an embodiment of the present invention.

Hereinafter, an optical filter according to an embodiment of the present invention will be described with reference to the drawings. An optical filter according to an embodiment of the present invention is not limited to any of those described in the following examples.

An optical filter according to an embodiment of the present invention includes a matrix and fine particles dispersed in the matrix. The optical filter has a novel structure, and is preferably usable as an infrared-transmissive filter exhibiting a white color and having a high infrared regular transmittance.

In the patent applications based on which the present application claims priority (Japanese Patent Application No. 2020-045671 and Japanese Patent Application No. 2020-163409), the present applicant discloses that it is preferred that fine particles dispersed in a matrix form at least a colloidal amorphous array. The "colloidal amorphous array" refers to an array of colloidal particles (particle diameter: 1 nm to 1 μm) that neither has a long-distance order nor causes Bragg reflection. This sharply contrasts to the colloidal particles being distributed so as to have a long-distance order, in which case a so-called colloidal crystal (a type of photonic crystal) is formed and Bragg reflection is caused. The fine particles (colloidal particles) forming the colloidal amorphous array do not form diffraction grating. The entirety of Japanese Patent Application No. 2020-045671 and Japanese Patent Application No. 2020-163409 is incorporated herein by reference.

As a result of further studies made by the present applicant, it has been found out, as described below in detail by way of examples and comparative examples, that an optical filter exhibiting a white color and having a high infrared regular transmittance is obtained even if the fine particles thereof cause Bragg reflection of light in a visible light region. The degree of whiteness and the level of the infrared regular transmittance vary in accordance with the use of the optical filter and may be adjusted by, for example, changing the thickness of the filter. In order to obtain an optical filter exhibiting a white color and having a high infrared regular transmittance, it is important to control the dispersion state of the fine particles.

The present inventors have found out that an optical filter having a parameter Ds that is not smaller than 8.0 and not larger than 30 includes fine particles in an appropriate dispersion state and is preferably usable as an infrared-transmissive filter exhibiting a white color and having a high infrared regular transmittance. The parameter Ds is given by $Ds=\lambda/(B \cdot \cos\theta \cdot Ra)$ found from a pattern of Ultra Small Angle X-ray Scattering (USAXS) (where $\lambda$ is the wavelength of the X-ray, $\theta$ is half of the scattering angle $2\theta$ (rad) giving the peak of the scattering intensity, B is the half width of the peak (FWHM, rad), and Ra is the average particle diameter of the fine particles). The dispersion state of the fine particles that is characterized by the parameter Ds is considered to have an order (periodicity) suitable for the optical filter to exhibit a white color and have a high infrared regular transmittance. The dispersion state of the fine particles that is characterized by the parameter Ds may contain a dispersion state that may be classified as a colloidal crystal causing Bragg reflection of light in a visible light region and also contain a colloidal amorphous array that does not cause Bragg reflection. In the case where the fine particles cause Bragg reflection, the optical filter is colored when being viewed at a particular angle. In order to cause the optical filter to appear white regardless of the angle at which the optical filter is viewed, it is preferred that the fine particles form a colloidal amorphous array. The technological significance of the parameter Ds will be described in detail below with reference to FIG. 2.

An optical filter according to an embodiment of the present invention may exhibit a white color. Such an optical filter exhibiting a white color may be provided with a design of any of various colors. The "white color" may be defined variously in accordance with the use of the optical filter. For example, the color exhibited in the case where the standard light is from a D65 light source is considered as being a white color in the case where x and y coordinates are in ranges of $0.25 \leq x \leq 0.40$ and $0.25 \leq y \leq 0.40$ on a CIE 1931 chromaticity diagram. Needless to say, a color closer to x=0.333 and y=0.333 has a higher degree of whiteness. The x and y coordinates are preferably $0.28 \leq x \leq 0.37$ and $0.28 \leq y \leq 0.37$, and more preferably $0.30 \leq x \leq 0.35$ and $0.30 \leq y \leq 0.35$. The value of L* measured by the SCE method on a CIE 1976 color space is preferably 20 or larger, more preferably 40 or larger, still more preferably 50 or larger, and especially preferably 60 or larger. A color having a value of L* of 20 or larger may generally be considered to be white. The upper limit of the value of L* is, for example, 100.

An optical filter according to an embodiment of the present invention may have a regular transmittance of 60% or higher for light having a wavelength in at least a part of a wavelength range not shorter than 760 nm and not longer 2000 nm. For example, an optical filter having a regular transmittance of 60% or higher for light having a wavelength not shorter than 950 nm and not longer than 1500 nm is obtained. The wavelength range of the light for which the optical filter has a regular transmittance of 60% or higher (wavelength range of near infrared light) is preferably, for example, not shorter than 810 nm and not longer than 1700 nm, and more preferably, not shorter than 840 nm and not longer than 1650 nm. Such an optical filter is preferably usable for, for example, an InGaAs sensor, an InGaAs/GaAsSb sensor, a CMOS sensor, an NMOS sensor, and a CCD sensor. It is preferred that the matrix and the fine particles are both transparent to the visible light (hereinafter, referred to simply as "transparent").

The infrared regular transmittance of the optical filter may be appropriately set in accordance with the use thereof. The optical filter according to an embodiment of the present invention may be located on a front surface of an infrared receiver of any of various devices to form an optical module. Examples of device including an infrared receiver include a sensing device, a communication device, a solar cell, a heater, and a power supply device.

The fine particles included in an optical filter according to an embodiment of the present invention include mono-dispersed fine particles having an average particle diameter that is at least 1/10 of the wavelength of the infrared rays. Namely, for the infrared rays having a wavelength in a range not shorter than 760 nm and not longer than 2000 nm, the average particle diameter of the fine particles is preferably at least 80 nm, more preferably at least 150 nm, and still more preferably at least 200 nm. The upper limit of the average particle diameter of the fine particles is, for example, 300 nm. The fine particles may include two or more types of mono-dispersed fine particles having different average diameters. It is preferred that each of the fine particles is generally spherical. In this specification, the term "fine particles" (plural) is also used in the sense of an array of the fine particles. The term "mono-dispersed fine particles" refers to those having a coefficient of variation (a percentage value of standard deviation/average particle diameter) of 20% or lower, preferably 10% or lower, and more preferably 1 to 5%. An optical filter according to an embodiment of the present invention uses particles having a particle diameter (diameter of the particle, volume-equivalent diameter) that is at least 1/10 of the wavelength of the infrared rays, and thus has an improved infrared regular transmittance. The principle of the optical filter according to an embodiment of the present invention is different from that of the optical item of Patent Document 2, which utilizes Rayleigh scattering. The average particle diameter of the fine particles is measured by, for example, a disc centrifuge.

FIG. 1 is a schematic cross-sectional view of an optical filter 10 according to an embodiment of the present invention. The optical filter 10 according to an embodiment of the present invention includes a matrix 12 transparent to visible light and transparent fine particles 14 dispersed in the matrix 12.

As schematically shown in FIG. 1, the optical filter 10 has a substantially flat surface. Herein, the expression "substantially flat surface" refers to a surface that does not have a concaved and convexed structure of such a size as to scatter (diffract) or diffuse-reflect visible light or infrared rays. The optical filter 10 does not contain a cholesteric liquid crystal material (encompassing a polymeric liquid crystal material, a low-molecular weight liquid crystal material, a mixture thereof, and such a liquid crystal material mixed with a crosslinker to be, for example, crosslinked and thus solidified; widely encompassing a liquid crystal material having a cholesteric phase). The optical filter 10 is, for example, film-like, but is not limited to this.

The transparent fine particles 14 are, for example, silica fine particles. Usable as the silica fine particles are silica fine particles synthesized by, for example, a Stober method. As the fine particles, inorganic fine particles other than silica fine particles may be used. Resinous fine particles may be used. The resinous fine particles are preferably fine particles formed of at least one of, for example, polystyrene and poly(methyl methacrylate), and more preferably fine particles formed of crosslinked polystyrene, crosslinked poly (methyl methacrylate) or crosslinked styrene-methyl methacrylate copolymer. As such fine particles, for example, polystyrene fine particles or poly(methyl methacrylate) fine particles synthesized by emulsion polymerization may be used when appropriate. Alternatively, air-containing hollow silica fine particles or hollow resinous fine particles may be used. Fine particles formed of an inorganic material are advantageous in being highly resistant against heat and light. The fine particles have a volume fraction that is preferably not lower than 6% and not higher than 60%, more preferably not lower than 20% and not higher than 50%, and still more preferably not lower than 20% and not higher than 40% with respect to the entirety of the optical filter (including the matrix and the fine particles). The transparent fine particles 14 may have optical isotropy.

The matrix 12 may be formed of, for example, acrylic resin (e.g., poly(methyl methacrylate), poly(methyl acrylate)), polycarbonate, polyester, poly(diethyleneglycolbisallylcarbonate), polyurethane, epoxy resin, or polyimide, but is not limited to being formed of any of these materials. It is preferred that the matrix 12 is formed of a curable (thermosetting or thermoplastic) resin. From the point of view of mass-productivity, it is preferred that the matrix 12 is formed of a photocurable resin. As the photocurable resin, any of various (meth)acrylates is usable. It is preferred that such a (meth)acrylate contains two-functional or at least three-functional (meth)acrylate. It is preferred that the matrix 12 has optical isotropy. Use of a curable resin containing a polyfunctional monomer allows the matrix 12 to have a crosslinked structure. Therefore, the heat resistance and the light resistance are improved.

The optical filter 10 including the matrix 12 formed of a resin material may be like a flexible film. The optical filter 10 has a thickness that is, for example, not less than 10 μm and not greater than 10 mm. As long as the thickness of the optical filter 10 is, for example, not less than 10 μm and not greater than 1 mm, or further, not less than 10 μm and not greater than 500 μm, the flexibility thereof is conspicuously expressed.

In the case where silica fine particles having a hydrophilic surface are used as the fine particles, it is preferred that, for example, a hydrophilic monomer is photocured to form such silica fine particles. Examples of the hydrophilic monomer include polyethyleneglycol(meth)acrylate, polyethyleneglycoldi(meth)acrylate, polyethyleneglycoltri(meth)acrylate, polypropyleneglycol(meth)acrylate, polypropyleneglycoldi(meth)acrylate, polypropyleneglycoltri(meth)acrylate, 2-hydroxyethyl(meth)acrylate, 2-hydroxypropyl(meth)acrylate, acrylamide, methylenebisacrylamide, and ethoxylated bisphenol A di(meth)acrylate. The hydrophilic monomer is not limited to any of these materials. One of these monomers may be used independently, or two or more of these monomers may be used in mixture. Needless to say, such two or more monomers may include a monofunctional monomer and a polyfunctional monomer, or may include two or more polyfunctional monomers.

These monomers may be cured when appropriate by use of a photoinitiator. Examples of the photoinitiator include carbonyl compounds such as benzoinether, benzophenone, anthraquinone, thioxane, ketal, acetophenone, and the like; sulfur compounds such as disulfide, dithiocarbamate, and the like; organic peroxides such as benzoyl peroxide, and the like; azo compounds; transfer metal complexes; polysilane compounds; dye sensitizers; etc. Such a photoinitiator is contained at a content that is preferably not lower than 0.05 parts by mass and not higher than 3 parts by mass, and more preferably not lower than 0.05 parts by mass and not higher than 1 part by mass, with respect to 100 parts by mass of the mixture of the fine particles and the monomer.

Where the refractive index of the matrix to the visible light is $n_M$ and the refractive index of the fine particles to the visible light is $n_P$, $|n_M-n_P|$ (hereinafter, may be referred to simply as the "refractive index difference") is preferably not smaller than 0.01 and not larger than 0.6, and more preferably not smaller than 0.03 and not larger than 0.11. If the refractive index difference is smaller than 0.03, the scattering intensity is too weak to easily provide desired optical characteristics. If the refractive index difference is larger than 0.11, the infrared regular transmittance may be decreased. In the case where, for example, zirconia fine particles (refractive index: 2.13) and an acrylic resin are used to realize a refractive index difference of 0.6, the thickness may be decreased to adjust the infrared regular transmittance. As can be seen, the infrared regular transmittance is adjustable by, for example, controlling the thickness of the optical filter and the refractive index difference. For a certain use, the optical filter and a filter absorbing infrared rays may be used in a stacking manner. The refractive index to the visible light may be represented by, for example, the refractive index to light of 546 nm. Herein, the "refractive index" refers to a refractive index to light of 546 nm unless otherwise specified.

An optical filter according to an embodiment of the present invention may be produced by a production method including, for example, a step of preparing a curable resin composition containing fine particles dispersed and mixed in a curable resin, a step of providing a surface of a substrate with the curable resin composition, and a step of curing the curable resin contained in the curable resin composition provided on the surface. The substrate may be, for example, a glass substrate or a resin film formed of, for example, PET (polyethyleneterephthalate), TAC (triacetylcellulose) or PI (polyimide). The substrate is not limited to being formed of any of these materials. The fine particles may be dispersed and mixed in the curable resin by a known dispersion and mixing device such as a homo mixer, a homogenizer (e.g., supersonic homogenizer, high-pressure homogenizer), or the like. The step of providing the surface with the curable resin composition may be performed by any of various known methods such as, for example, a coating method (e.g., dip coating method, spray coating method, die coating method), a printing method and the like.

Hereinafter, specific experiment examples (examples and comparative examples) will be shown to describe features of a structure and optical characteristics of an optical filter according to an embodiment of the present invention. Table 1 shows structures and optical characteristics of optical filters in examples and comparative examples. Various optical filters shown in Table 1 that were different in the type of resin combined with the silica fine particles, presence/absence of a flocculant or a dispersant, and the dispersion and mixing method were produced.

Figure 3:
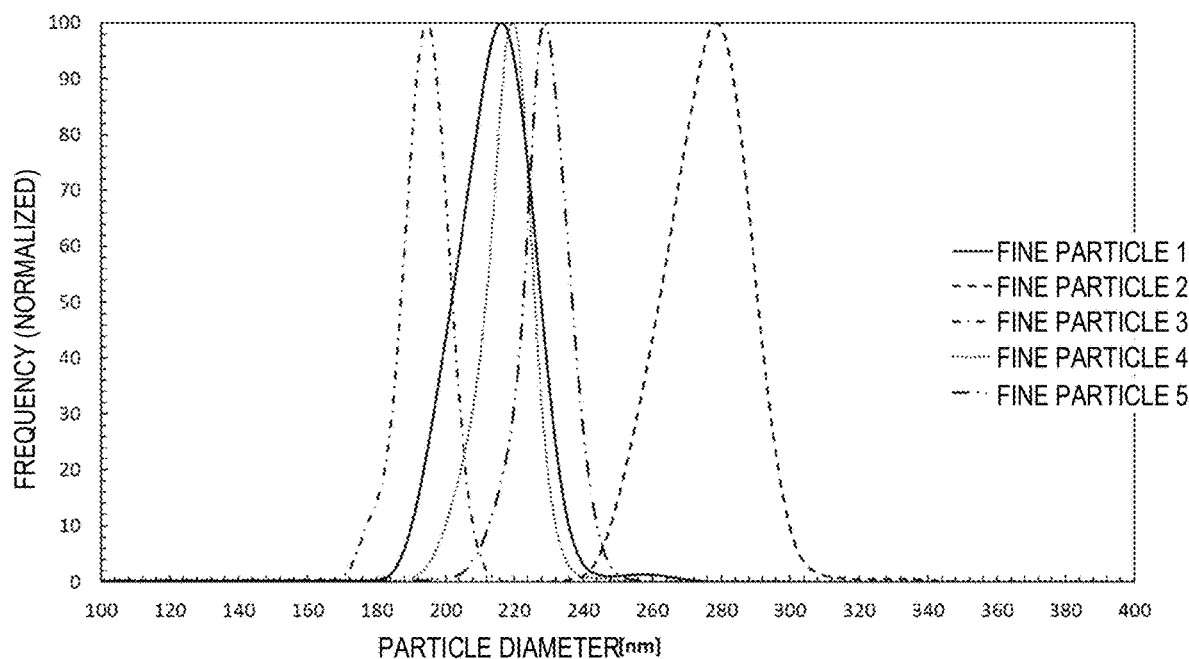
FIG. 3 is a graph showing the particle size distribution of the fine particles.
Figure 4:
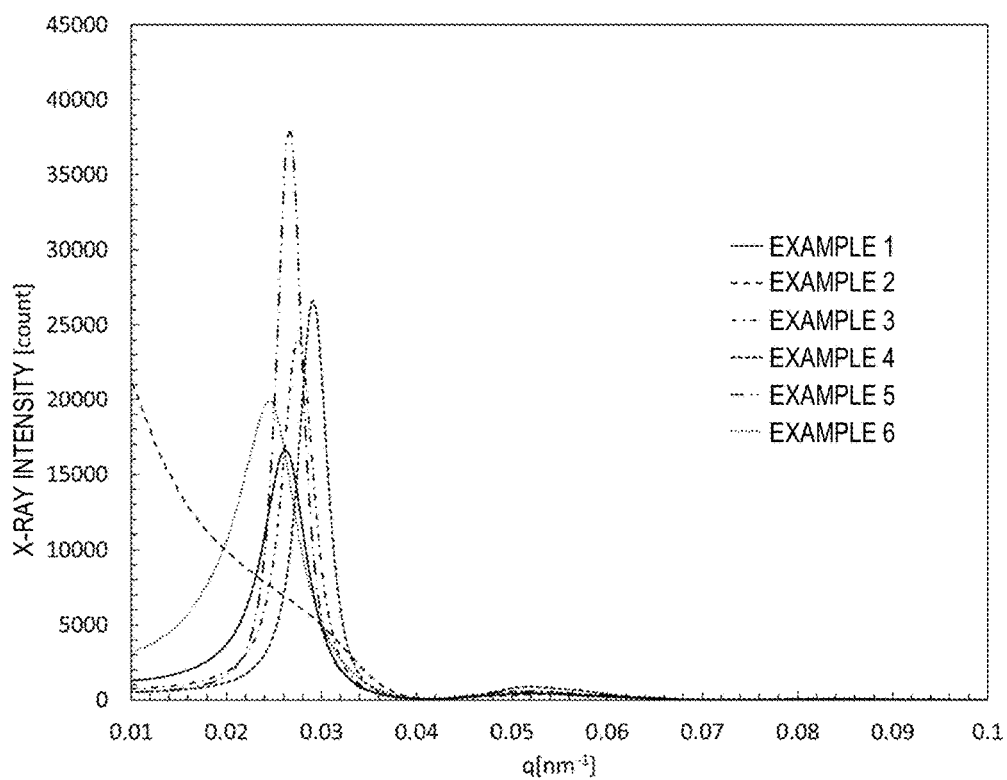
FIG. 4 shows USAXS patterns of optical films in examples 1 through 6.
Figure 5:
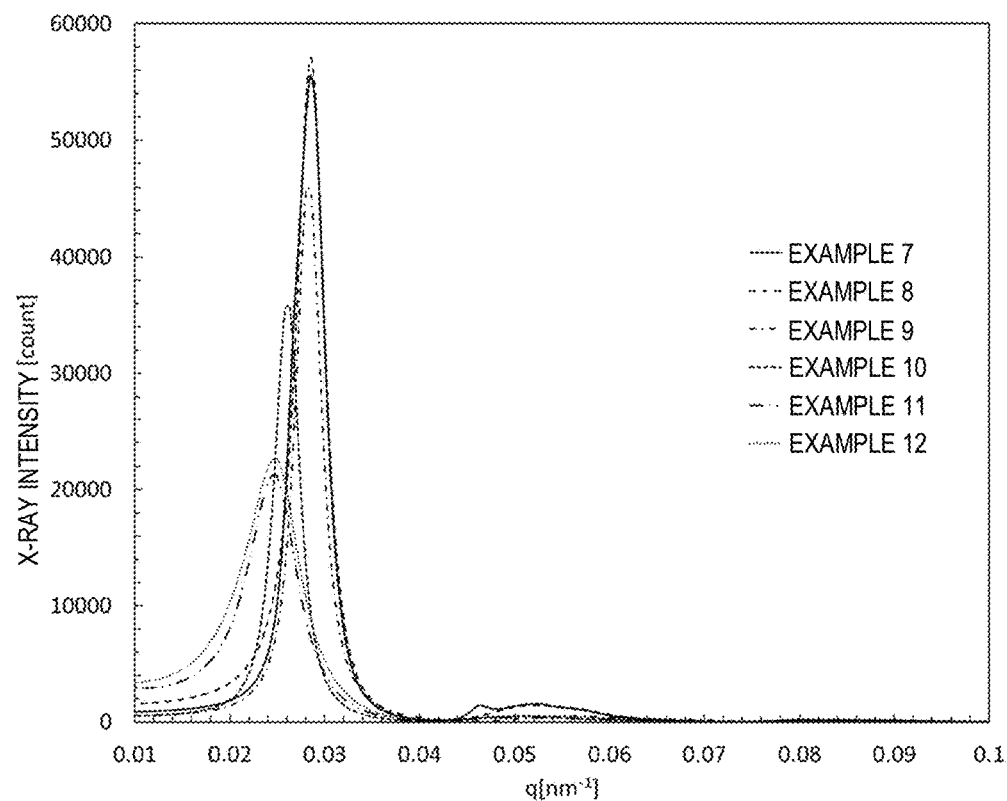
FIG. 5 shows USAXS patterns of optical films in examples 7 through 12.
Figure 6:
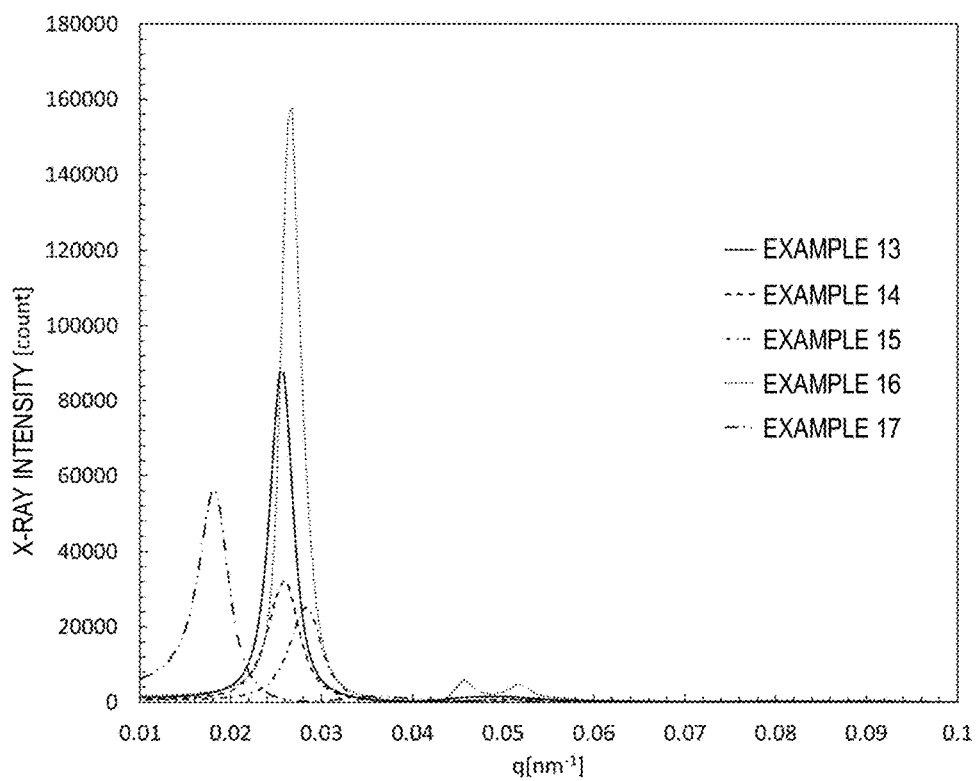
FIG. 6 shows USAXS patterns of optical films in examples 13 through 17.
Figure 7:
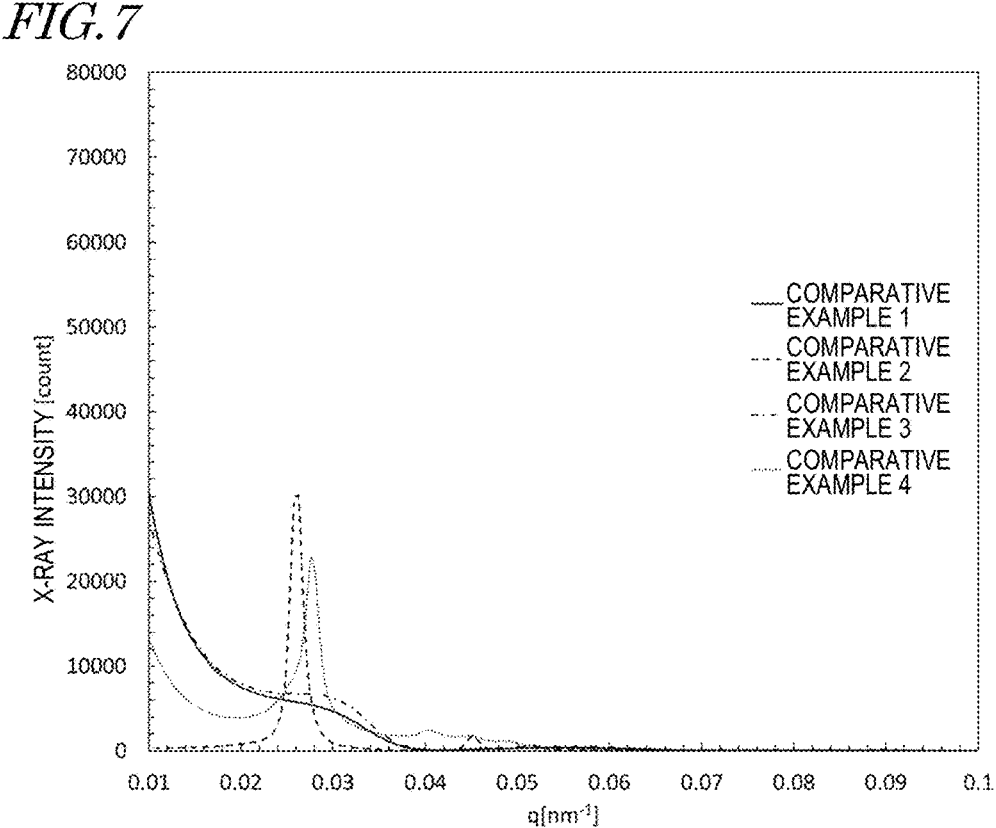
FIG. 7 shows USAXS patterns of optical films in comparative examples 1 through 4.
Figure 8:
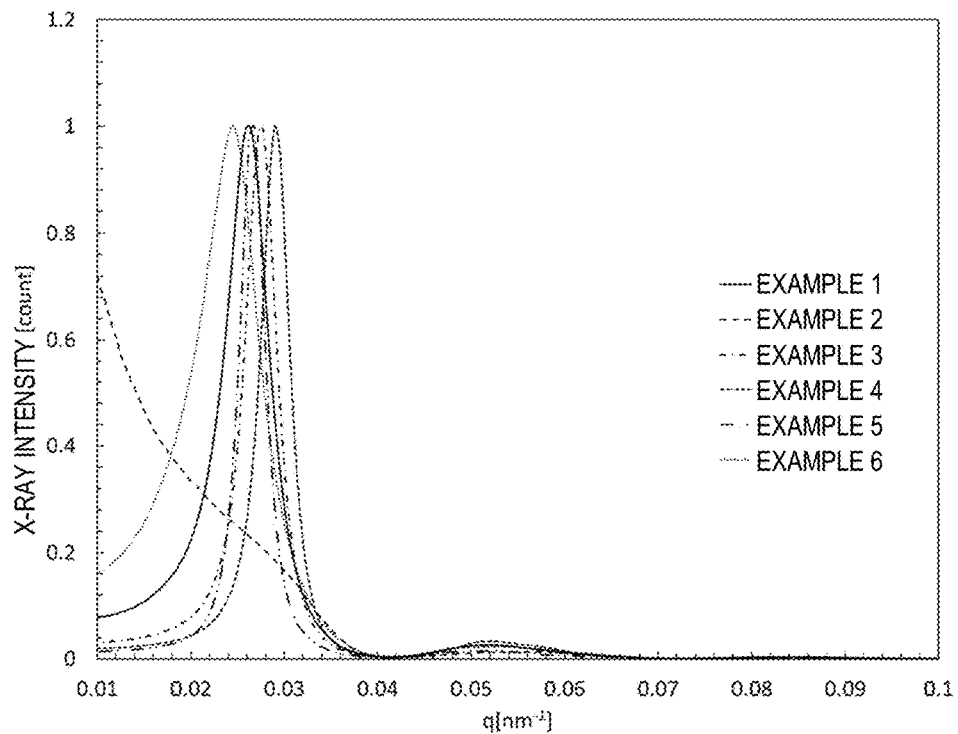
FIG. 8 shows USAXS patterns (normalized) of the optical films in examples 1 through 6.
Figure 9:
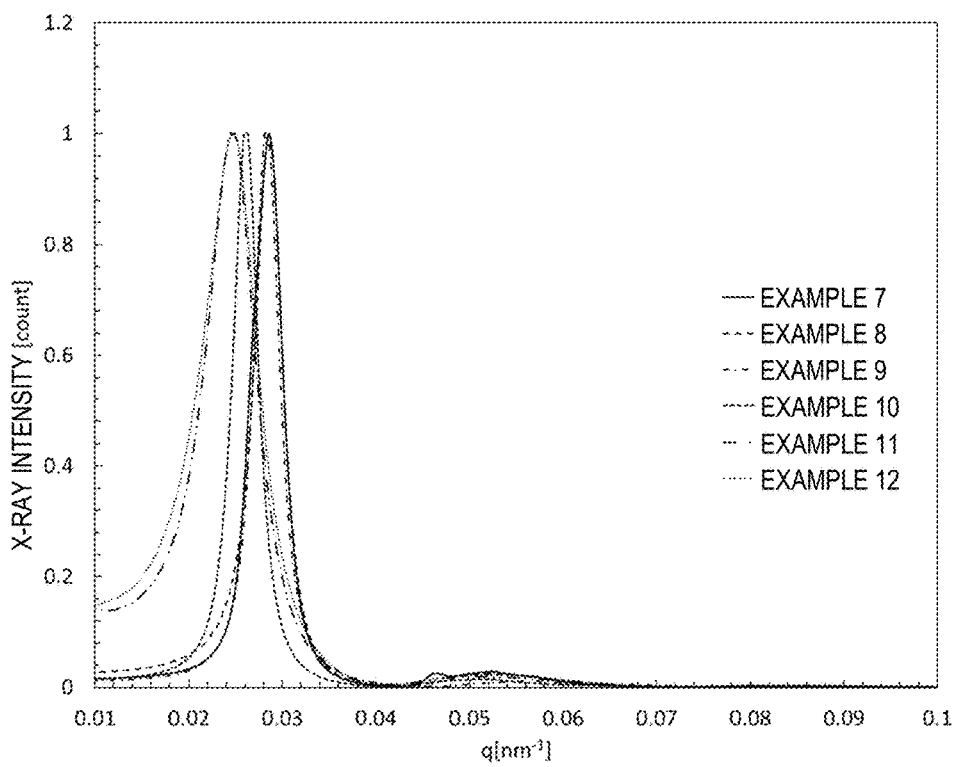
FIG. 9 shows USAXS patterns (normalized) of the optical films in examples 7 through 12.
Figure 10:
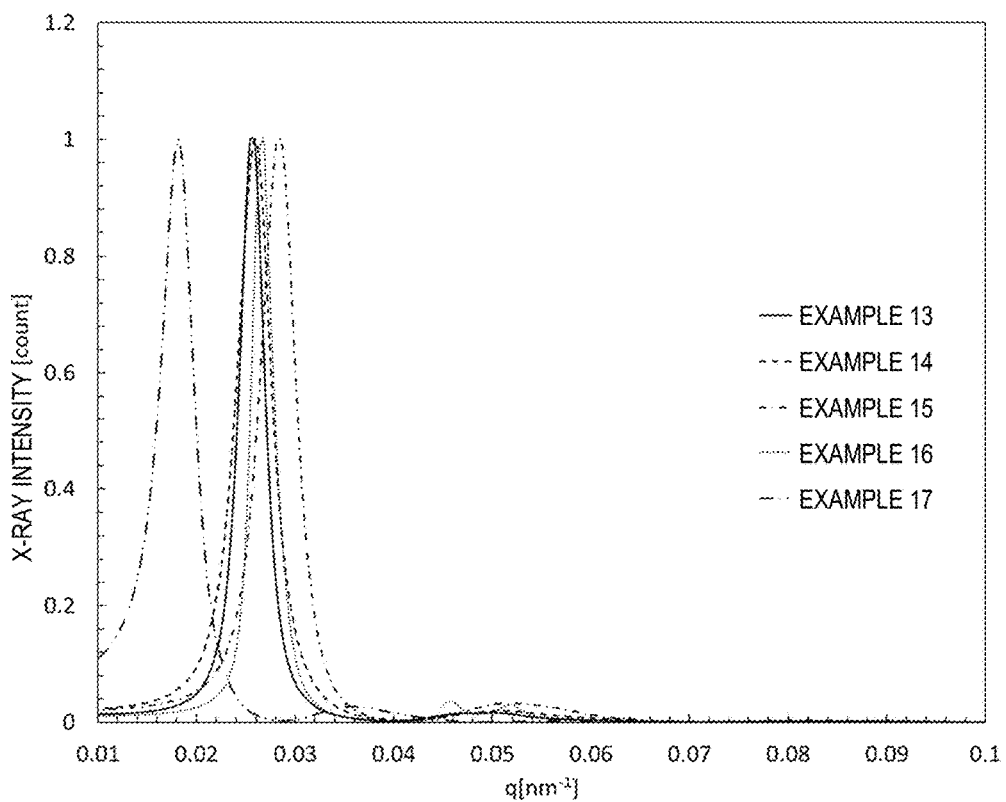
FIG. 10 shows USAXS patterns (normalized) of the optical films in examples 13 through 17.
Figure 11:
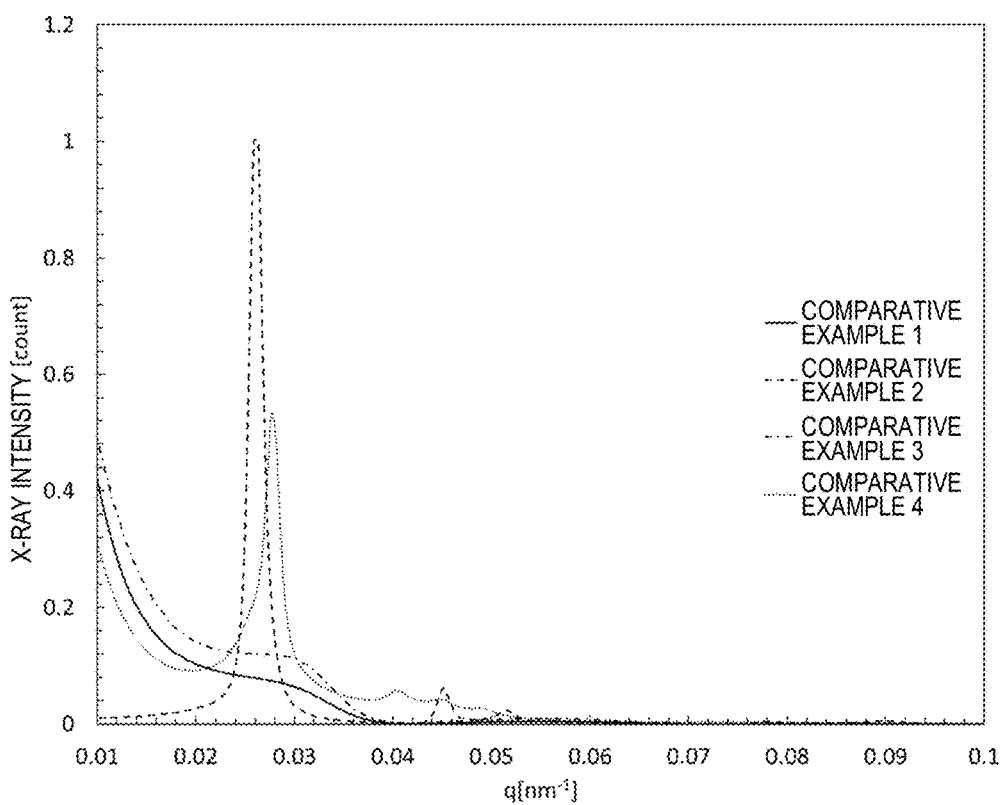
FIG. 11 shows USAXS patterns (normalized) of the optical films in comparative examples 1 through 4.

The optical filters in examples 1 through 17 and comparative examples 1 through 3 were each formed as a film by use of the acrylic resin shown in Table 1 and the silica fine particles. Used as the silica fine particles were monodispersed silica fine particles synthesized by a Stober method. Five types of fine particles 1 through 5 having different average particle diameters as shown in Table 2 were used. The average particle diameter, the standard deviation and the CV value were measured by use of a disc centrifuge (DC24000UHR) produced by CPS Instruments, Inc. FIG. 3 shows the particle size distribution of fine particles 1 through 5. The optical filter in comparative example 4 was formed of photonic rubber commercially available from Soft Photonics Godo Kaisha. In this material, nano particles form a photonic crystal, which strongly reflects light of a specific color by Bragg reflection. When the optical filter is deformed, the interval between the nano particles forming the photonic crystal is changed, and thus the color of the reflected light is changed. Referring to Table 1, the particle diameter with (*) of comparative example 4 is found from a USAXS pattern described below.

The silica fine particles were mixed and dispersed in each of acrylic monomers A through E at a predetermined content to prepare a curable resin composition. A surface of a substrate was coated with the curable resin composition by use of an applicator such that a film having a desired thickness would be obtained. The curable resin composition was cured to obtain an optical filter. The curable resin composition was cured as follows. Darocule 1173 used as the photoinitiator was incorporated into the acrylic monomer at a content of 0.2 parts by mass with respect to 100 parts by mass of the acrylic monomer, and the curable resin composition was irradiated with a UV lamp and thus cured by photopolymerization. Different types of monomer were used to form resins (polymers) having different refractive indices.

Acrylic monomers A through E will be shown below. Monomers A and E are trifunctional acrylates, monomers B and C are bifunctional acrylates, and monomer D is a monofunctional acrylate.

A: Pentaerythritoltriacrylate
  B: Ethoxylated bisphenol A diacrylate (m+n=10)
  C: Ethoxylated bisphenol A diacrylate (m+n=3)
  D: Methoxypolyethyleneglycol #400 methacrylate
  E: Trimethylolpropane EO denatured triacrylate
  F: Ethoxylated bisphenol A diacrylate (m+n=4)
  G: Ethoxylated bisphenol A diacrylate (m+n=6)

Acrylic monomers B, C, F and G are represented by the following chemical formula (formula 1).

[Formula 1]

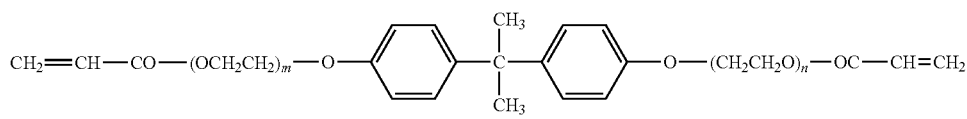

In comparative example 1, in order to examine the change in the dispersion state of the fine particles, polyethyleneglycol was incorporated as a flocculant at a content of 0.1% by mass with respect to acrylic monomer A. In example 8, DISPERBYK-111 produced by BYK was incorporated as a dispersant at a content of 0.5% by mass with respect to acrylic monomer B. In example 11, DISPERBYK-180 produced by BYK was incorporated as a dispersant at a content of 0.1% by mass with respect to acrylic monomer B.

The dispersion state of the fine particles included in an optical filter is represented by the parameter Ds given by $Ds=\lambda/(B \cdot \cos\theta \cdot Ra)$ found from a USAXS pattern. The parameter Ds of an optical filter according to an embodiment of the present invention is not smaller than 8.0 and not larger than 30. In the above expression, $\lambda$ is the wavelength of the X-ray, $\theta$ is half of the scattering angle $2\theta$ (rad) giving the peak of the scattering intensity, B is the half width of the peak (FWHM, rad), and Ra is the average particle diameter of the fine particles.

Figure 2:
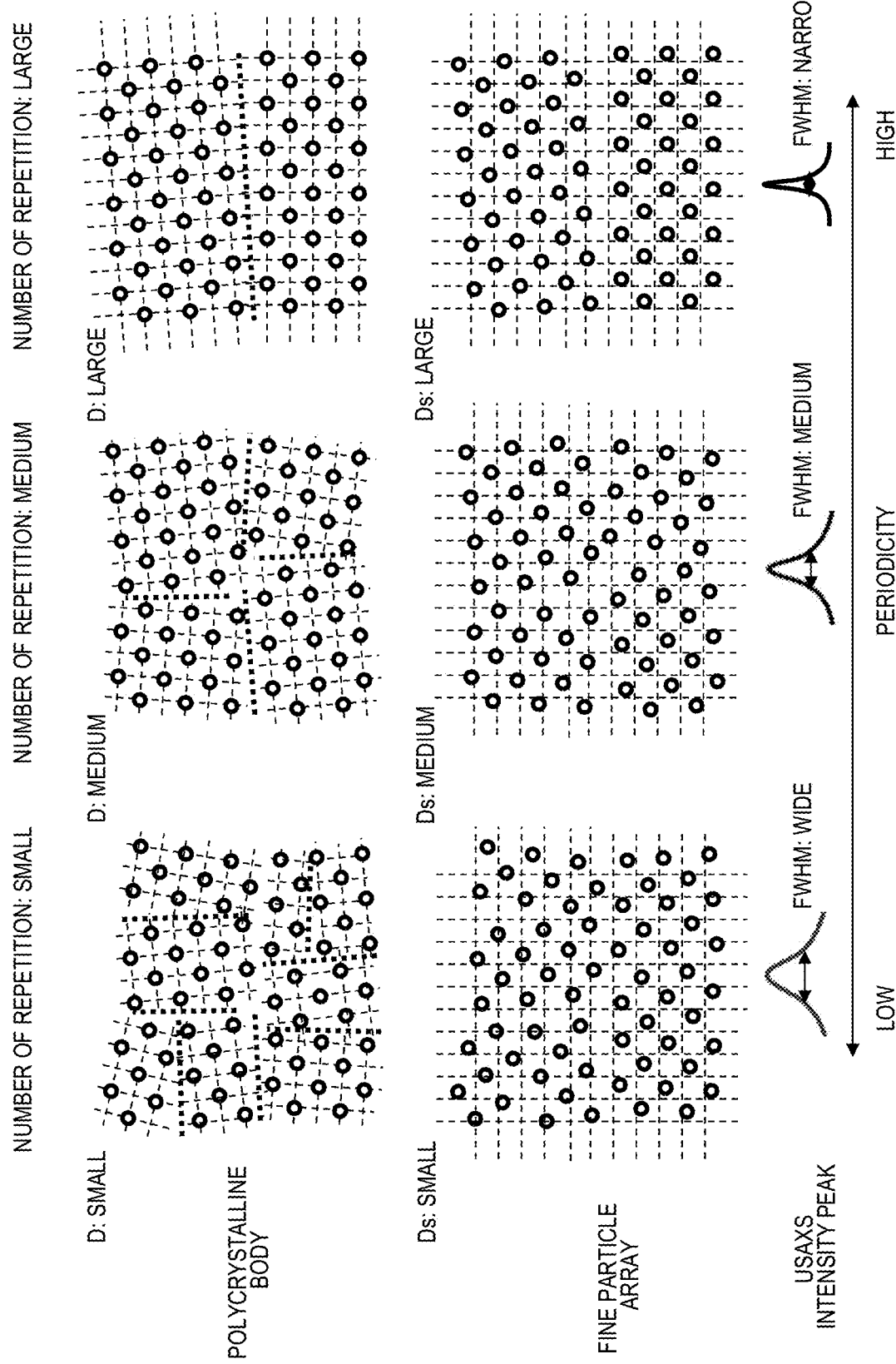
FIG. 2 is a schematic view illustrating the technological significance of the parameter Ds, which represents a dispersion state of fine particles in a fine particle array.

With reference to FIG. 2, the technological significance of the parameter Ds will be described. FIG. 2 is a schematic view illustrating the relationship between the dispersion state (degree of periodicity) of fine particles in a fine particle array and the half width of the peak of the USAXS intensity. In FIG. 2, the size of a crystal grain (crystallite) of a polycrystalline body is compared with the well-known Scherrer equation, which is used to estimate the relationship between the half width of the peak of the X-ray diffraction. In a part of the schematic view of FIG. 2 that shows the polycrystalline body, the white circles represent atoms. In a part of the schematic view of FIG. 2 that shows the fine particles, the white circles represent fine particles. In order to obtain information on the dispersion state of the fine particles each having a particle diameter of about 100 nm, it is needed to analyze the X-ray scattering pattern of the ultra small angle region.

The size of the crystal grain of the polycrystalline body (fine particle array) may be estimated by the well-known Scherrer equation shown below.

$$D = K \cdot \lambda / (B \cdot \cos \theta)$$

In the equation, B is the breadth (half width) of the diffraction line width caused by the crystal grain being finite, and has the relationship represented by the following expression (1) with the actually measured diffraction line width Bobs and the breadth b of the line width caused by the device.

$$Bobs = B + b \quad (1)$$

D is the size of the crystal grain, λ is the wavelength of the X-ray, and θ is the Bragg angle (half of the diffraction angle 2θ). Constant K is called the "Scherrer constant", and the value thereof varies in accordance with how proximately the intensity is to be found or which actually measured amount is used to define the breadth B. The intensity of the diffraction peak is higher and the line width thereof is narrower as the structure having the period giving the diffraction is repeated a larger number of times, namely, as the crystal grain is larger.

By contrast, the intensity of the scattering peak (halo) of the fine particle array is higher and the line width thereof is narrower as the breadth of the fine particles distributed at a distance close to the average distance giving the scattering angle is larger. Regarding one fine particle, as the distance between the one fine particle and another fine particle located close thereto is closer to the average distance, or as the number of such fine particles are larger, the intensity of the scattering peak is higher and the line width thereof is narrower. Thus, the parameter Ds, which represents the "breadth of the fine particles distributed at the average distance" in the fine particle array will be represented, as a relative size with respect to the average particle diameter Ra of the fine particles, by the following expression (2).

$$Ds = \lambda / (B \cdot \cos \theta \cdot Ra) \quad (2)$$

Herein, USAXS is measured by use of the BL08B2 small angle X-ray scattering station of Spring 8. Therefore, the X-ray is highly collimated and b in expression (1) above is negligible. Thus, Bobs=B. The distance between each of the samples and the two-dimensional X-ray detector was set to 16 m (meters). As the X-ray, CuKα X-ray (wavelength λ=0.1542 nm) was used.

FIG. 4, FIG. 5, FIG. 6 and FIG. 7 show the measurement results of USAXS patterns that were baseline-corrected. FIG. 8, FIG. 9, FIG. 10 and FIG. 11 show the measurement results of the USAXS patterns with the scattering intensity being normalized with the maximum value. Table 1 shows the parameter Ds found from expression (2) based on the peak of each of the scattering patterns. In FIG. 4 through FIG. 11, the horizontal axis represents the scattering vector q, which has the relationships of $\theta = \sin^{-1}(q\lambda/4\pi)$ and half width $B(FWHM, rad) = \sin^{-1}(B_q\lambda/4\pi)$. $B_q$ is the half width (FWHM, $nm^{-1}$) represented by the scattering vector q.

The optical characteristics of an optical filter may be evaluated as follows.

Figure 12:
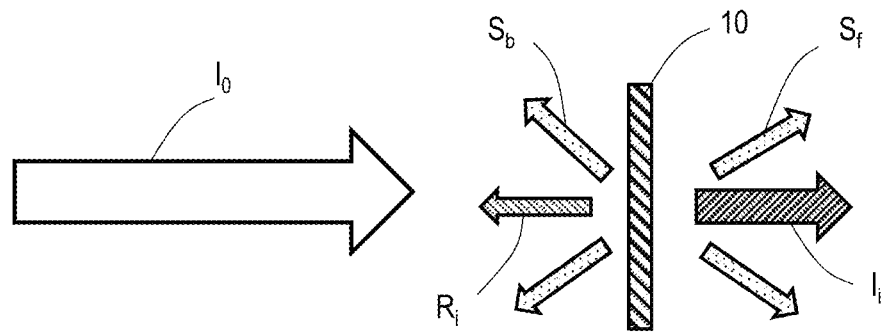
FIG. 12 is a schematic view illustrating optical characteristics of the optical filter 10 according to an embodiment of the present invention.

As shown in FIG. 12, when incident light $I_0$ is incident on the optical filter 10, a part of the incident light $I_0$ is transmitted through the optical filter (transmitted light $I_t$), another part of the incident light $I_0$ is reflected at an interface (interface-reflected light $R_i$), and the remaining part of the incident light $I_0$ is scattered. The scattered light includes forward scattered light $S_f$ output forward with respect to the optical filter 10 and rearward scattered light $S_b$ output rearward with respect to the optical filter 10. The rearward scattered light $S_b$ causes the optical filter 10 to exhibit a white color. A part of the incident light $I_0$ is absorbed by the optical filter 10, but the resin and the silica fine particles used herein have a low absorbance for light of 400 nm to 2000 nm.

Figure 13:
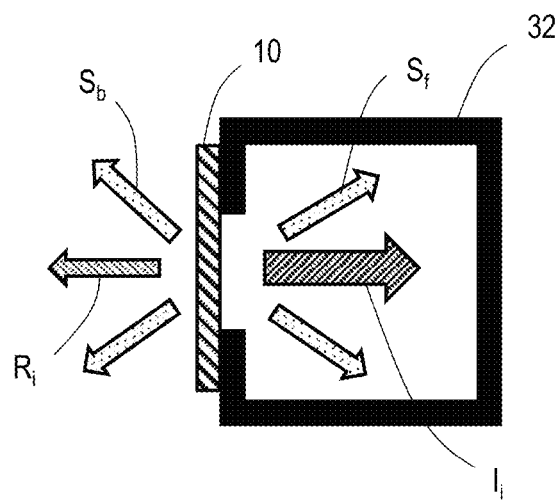
FIG. 13 is a schematic view showing a method for measuring a diffuse transmittance of an optical filter.
Figure 14:
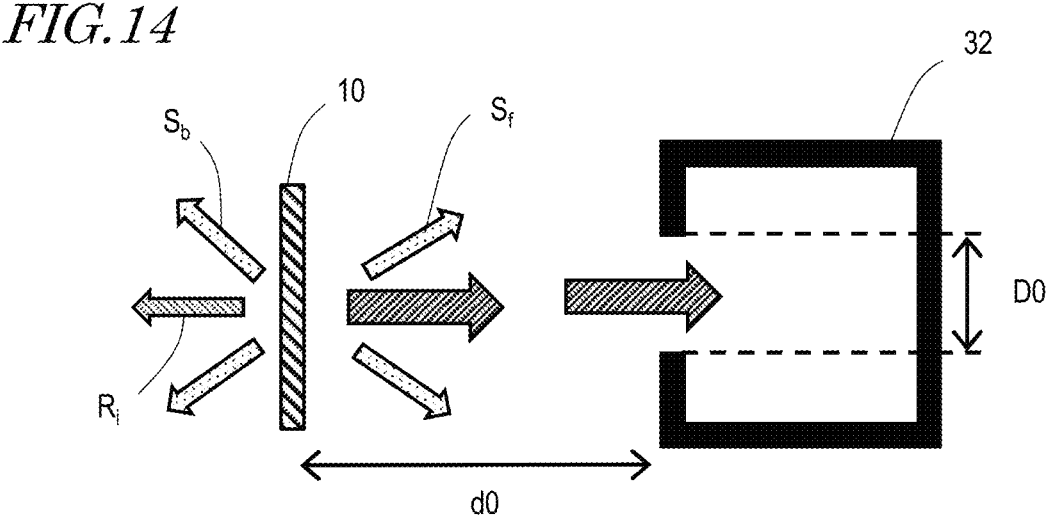
FIG. 14 is a schematic view showing a method for measuring a regular transmittance of an optical filter.
Figure 15:
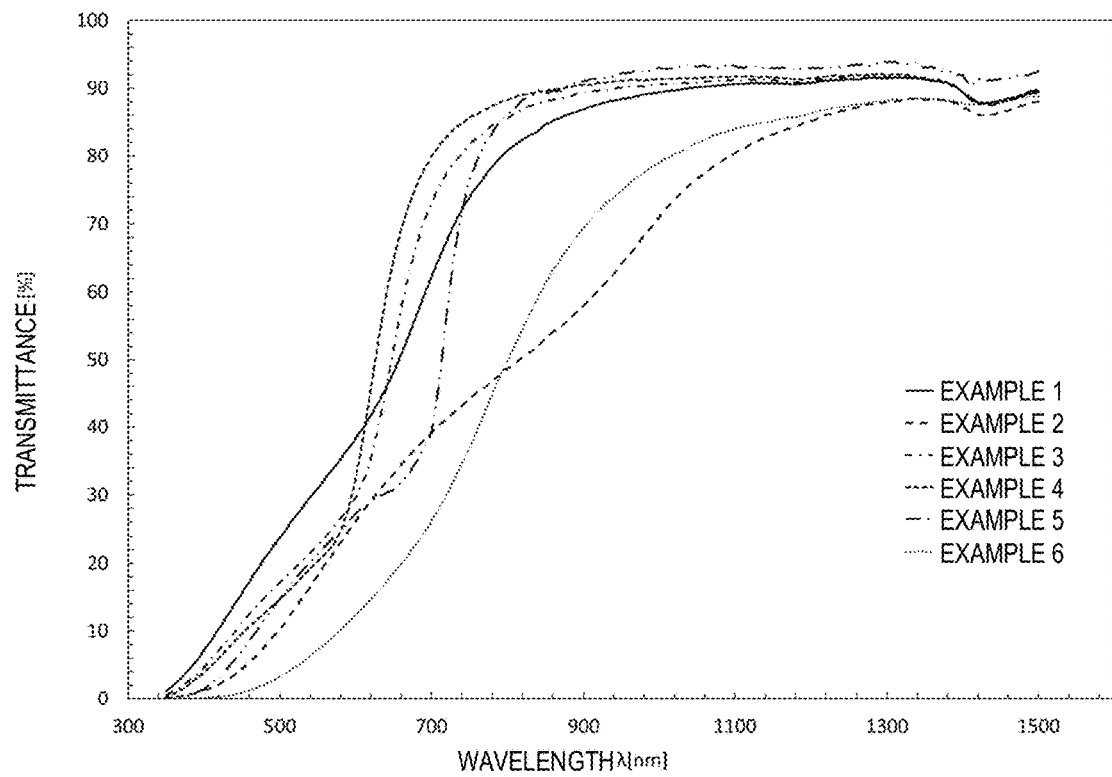
FIG. 15 shows regular transmittance spectra of the optical filters in examples 1 through 6.
Figure 16:
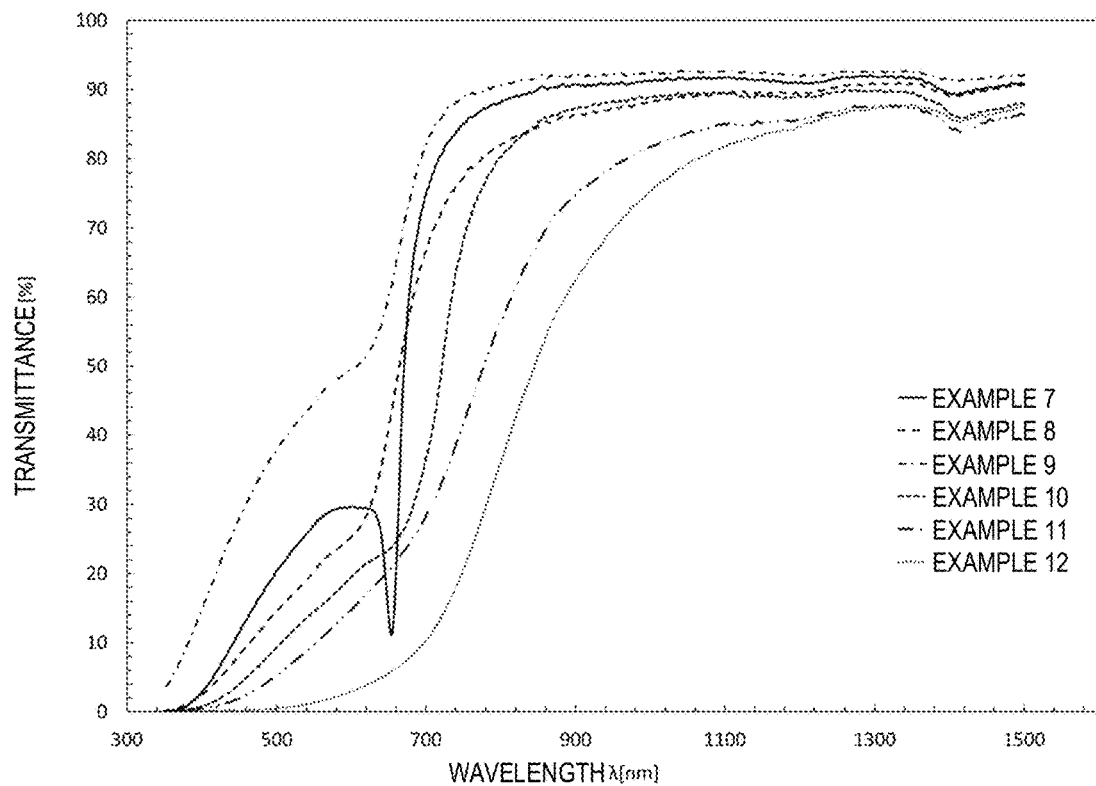
FIG. 16 shows regular transmittance spectra of the optical filters in examples 7 through 12.
Figure 17:
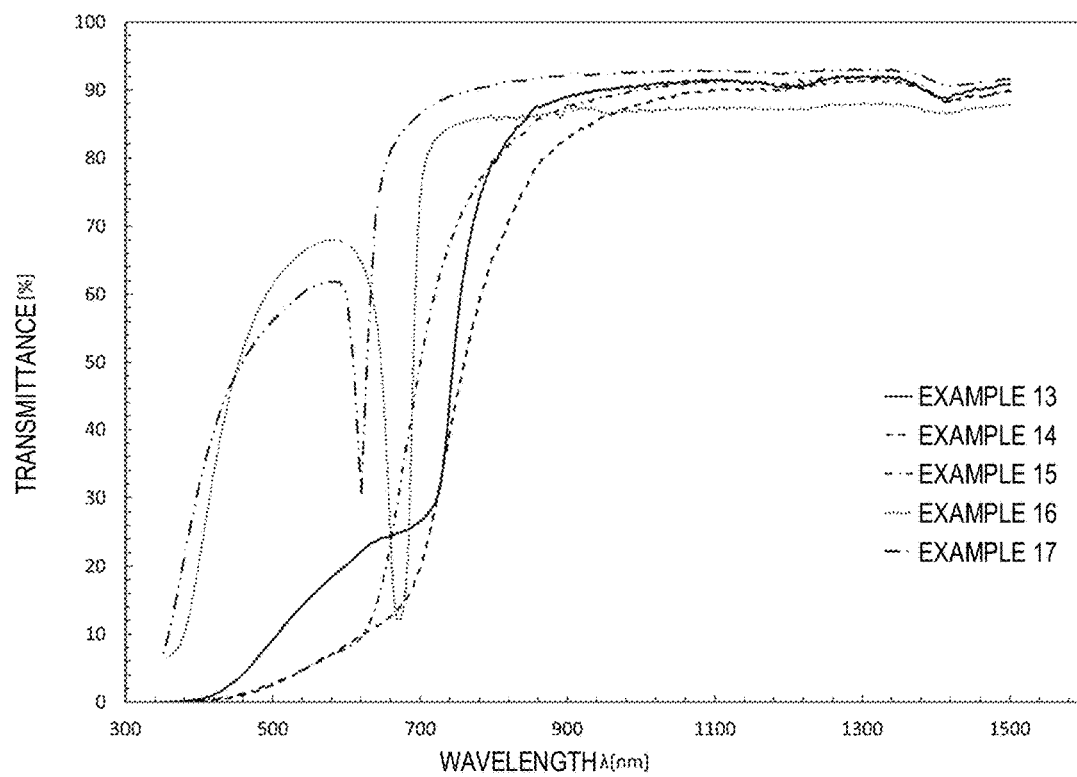
FIG. 17 shows regular transmittance spectra of the optical filters in examples 13 through 17.

FIG. 13 is a schematic view showing a method for measuring a diffuse transmittance of an optical filter. FIG. 14 is a schematic view showing a method for measuring a regular transmittance of an optical filter. As shown in FIG. 13, with a sample (optical filter 10) being located in an opening of an integrating sphere 32, the diffuse transmittance was found as a percentage of the total intensity of the transmitted light $I_t$ and the forward scattered light $S_f$ with respect to the intensity of the incident light $I_0$. For measuring the regular transmittance, a sample (optical filter 10) was located at a position 20 cm (d0=20 cm) away from the opening of the integrating sphere 32. The regular transmittance was found as a percentage of the intensity of the transmitted light $I_t$ obtained in this state with respect to the intensity of the incident light $I_0$. The opening has a diameter of 1.8 cm (D0=1.8 cm), which corresponds to a solid angle of 0.025 sr. As a spectrometer, a UV-Visible/NIR Spectrometer UH4150 (produced by Hitachi High-Tech Science Corporation) was used. Table 1 shows the values of the regular transmittance for infrared rays of 760 nm, 950 nm and 1500 nm. Regular transmittance spectra of the samples are shown in FIG. 15, FIG. 16, FIG. 17 and FIG. 18. The presence/absence of Bragg reflection may be determined based on whether or not the regular transmittance spectrum has a dimple (local drop in the transmittance).

The degree of whiteness of the rearward scattered light $S_b$ was measured by use of a spectrophotometer CM-2600-D (produced by Konica Minolta Japan, Inc.). The value of L* was found by the SCE (Specular Component Exclude) method, and also the values of x and y coordinates on the CIE 1931 chromaticity diagram were found. As the value of L* is larger and the values of the x and y coordinates are closer to 0.33, the degree of whiteness is higher. These values are also shown in Table 1.

TABLE 1

| | AVERAGE PARTICLE DIAMETER [nm] | FINE PARTICLE FRACTION | | POLYMER MONO-MER | REFRAC-TTIVE INDEX | THICK-NESS [μm] | L* (SCE) | COORDINATES ON CIE CHROMATICITY DIAGRAM | | INFRARED REGULAR TRANSMITTANCE [%] | | | |
|---|---|---|---|---|---|---|---|---|---|---|---|---|---|
| | | MASS % | VOL. % | | | | | x | y | @760 nm | @950 nm | @1500 nm | Ds |
| EX. 1 | 218 | 40 | 29 | A | 1.49 | 100 | 59 | 0.30 | 0.33 | 75 | 88 | 90 | 10.3 |
| EX. 2 | 280 | 40 | 29 | A | 1.49 | 100 | 70 | 0.30 | 0.31 | 45 | 64 | 88 | 9.0 |

TABLE 1-continued

| | AVERAGE PARTICLE DIAMETER [nm] | FINE PARTICLE FRACTION | | POLYMER MONO-MER | REFRAC-TTIVE INDEX | THICK-NESS [μm] | L* (SCE) | COORDINATES ON CIE CHROMATICITY DIAGRAM | | INFRARED REGULAR TRANSMITTANCE [%] | | | |
|---|---|---|---|---|---|---|---|---|---|---|---|---|---|
| | | MASS % | VOL. % | | | | | x | y | @760 nm | @950 nm | @1500 nm | Ds |
| EX. 3 | 218 | 45 | 34 | A | 1.49 | 100 | 60 | 0.31 | 0.32 | 83 | 90 | 89 | 14.4 |
| EX. 4 | 218 | 50 | 38 | A | 1.49 | 100 | 68 | 0.30 | 0.33 | 86 | 91 | 89 | 16.0 |
| EX. 5 | 218 | 40 | 28 | B | 1.52 | 100 | 69 | 0.30 | 0.32 | 79 | 92 | 93 | 18.0 |
| EX. 6 | 218 | 40 | 29 | C | 1.54 | 100 | 73 | 0.30 | 0.33 | 40 | 75 | 89 | 8.2 |
| EX. 7 | 220 | 50 | 36 | B | 1.52 | 226 | 73 | 0.31 | 0.32 | 86 | 91 | 91 | 15.0 |
| EX. 8 | 220 | 50 | 36 | B | 1.52 | 191 | 73 | 0.30 | 0.32 | 79 | 87 | 91 | 16.0 |
| EX. 9 | 194 | 40 | 28 | B | 1.52 | 115 | 62 | 0.29 | 0.31 | 90 | 92 | 92 | 20.0 |
| EX. 10 | 218 | 40 | 28 | B | 1.52 | 310 | 74 | 0.30 | 0.32 | 72 | 88 | 88 | 18.2 |
| EX. 11 | 218 | 40 | 28 | B | 1.52 | 310 | 76 | 0.30 | 0.32 | 45 | 79 | 86 | 11.6 |
| EX. 12 | 218 | 40 | 29 | F | 1.54 | 214 | 80 | 0.31 | 0.33 | 23 | 70 | 87 | 11.0 |
| EX. 13 | 229 | 40 | 28 | B | 1.52 | 263 | 74 | 0.30 | 0.32 | 64 | 90 | 91 | 18.5 |
| EX. 14 | 218 | 40 | 28 | G | about 1.5 | 200 | 78 | 0.30 | 0.32 | 50 | 86 | 90 | 13.9 |
| EX. 15 | 218 | 50 | 37 | G | about 1.5 | 181 | 80 | 0.31 | 0.33 | 73 | 89 | 90 | 13.7 |
| EX. 16 | 220 | 50 | 36 | B | 1.52 | 225 | 29 | 0.30 | 0.28 | 85 | 86 | 88 | 22.0 |
| EX. 17 | 218 | 40 | 29 | E | 1.48 | 100 | 49 | 0.33 | 0.31 | 90 | 92 | 92 | 13.7 |
| COMPARATIVE EX. 1 | 218 | 40 | 29 | A | 1.49 | 100 | 72 | 0.30 | 0.32 | 10 | 21 | 43 | 7.7 |
| COMPARATIVE EX. 2 | 220 | 50 | 38 | A | 1.49 | 75 | 3 | 0.27 | 0.18 | 91 | 91 | 92 | 31.7 |
| COMPARATIVE EX. 3 | 218 | 50 | 37 | F | 1.54 | 205 | 81 | 0.30 | 0.32 | 2 | 7 | 28 | 7.4 |
| COMPARATIVE EX. 4 | 145* | — | — | — | — | 1560 | 41 | 0.39 | 0.32 | — | — | — | 37.7 |

TABLE 2

| | FINE PARTICLE 1 | FINE PARTICLE 2 | FINE PARTICLE 3 | FINE PARTICLE 4 | FINE PARTICLE 5 |
|---|---|---|---|---|---|
| La: AVERAGE PARTICLE DIAMETER [nm] | 218 | 280 | 194 | 220 | 229 |
| Ld: STANDARD DEVIATION [nm] | 8.7 | 9.5 | 6.3 | 5.6 | 6.3 |
| CV VALUE (Ld/La) [%] | 4.0 | 3.4 | 3.2 | 2.5 | 2.8 |

As shown in Table 1, the optical filters in all of examples 1 through 17 exhibit a white color. In the case where standard light from a D65 light source is used, the x and y coordinates on the CIE 1931 chromaticity diagram of the exhibited color satisfy 0.25≤x≤0.40 and 0.25≤y≤0.40. The value of L* measured by the SCE method by use of a spectrophotometer is 20 or larger.

In all of examples 1 through 17, the regular transmittance for light having a wavelength in at least a part of a wavelength range not shorter than 760 nm and not longer 2000 nm is 60% or higher. Especially, the regular transmittance for light having a wavelength not shorter than 950 nm and not longer than 1500 nm is 60% or higher. The regular transmittance spectra mentioned above are merely shown up to 1500 nm. The regular transmittance for light having a wavelength in a region longer than 1500 nm and not longer than 2000 nm is generally equal to the regular transmittance for the light of 1500 nm although the former regular transmittance shows a slight local drop.

Figure 19:
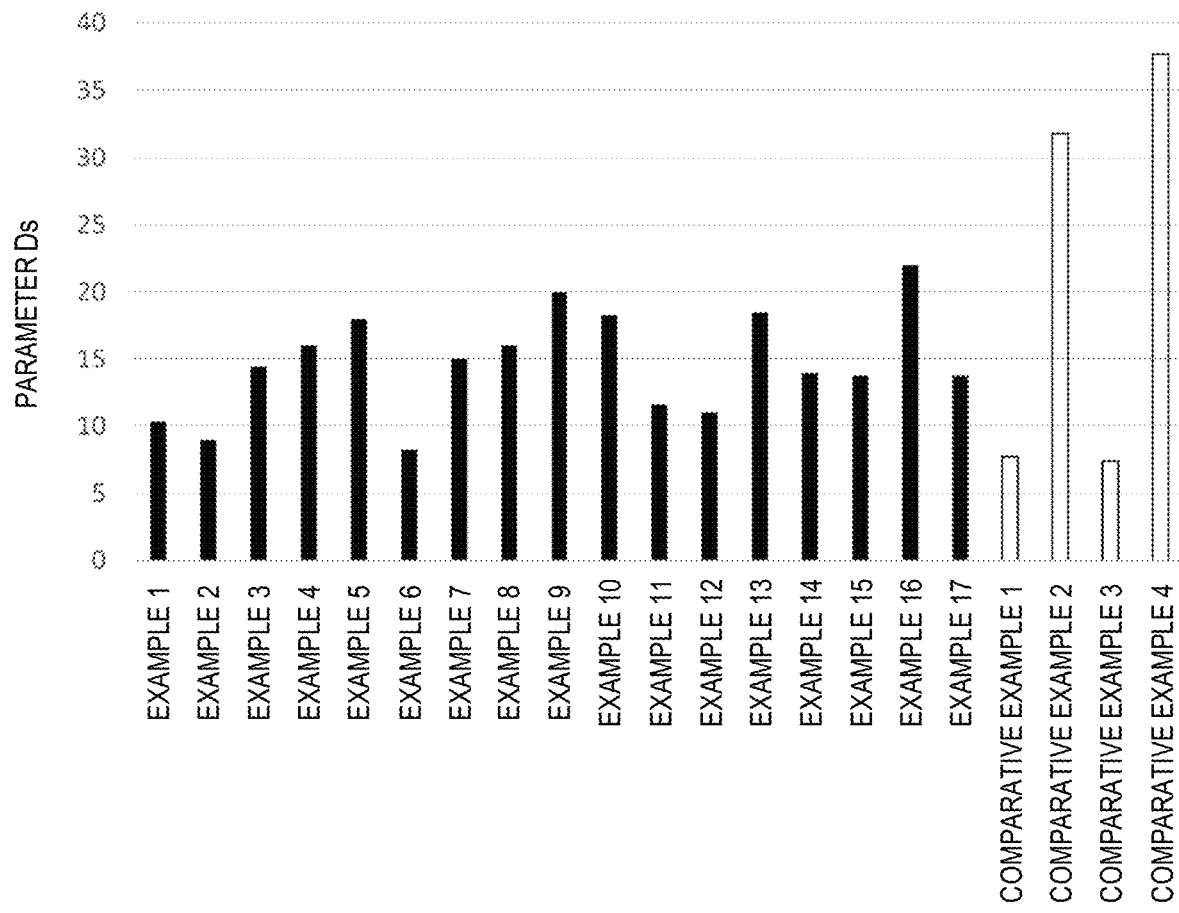
FIG. 19 is a bar graph showing values of the parameter Ds of samples.

FIG. 19 is a bar graph showing parameter Ds values of the samples. The Ds value in each of examples 1 through 17 is larger the Ds value of 7.7 in comparative example 1 and is smaller than the Ds value of 31.7 in comparative example 2. In comparative example 1, in which the Ds value is 7.7, and comparative example 3, in which the Ds value is 7.4, the degree of whiteness is sufficient, but the infrared regular transmittance for light having a wavelength in a range of 760 nm to 1500 nm does not reach 60% and thus is not sufficiently high. By contrast, in comparative example 2, in which the Ds value is as large as 31.7, the infrared regular transmittance is sufficiently high, but the degree of whiteness is low. From these results, the Ds value is preferably not smaller than 8.0 and not larger than 30, and more preferably not smaller than 8.2 and not larger than 22. In example 2 and example 6, in which the Ds value is smaller than 10, the infrared transmittance is relatively low. Based on these results, from the point of view of the infrared transmittance, the Ds value is preferably 10 or larger, and more preferably 14 or larger.

Figure 18:
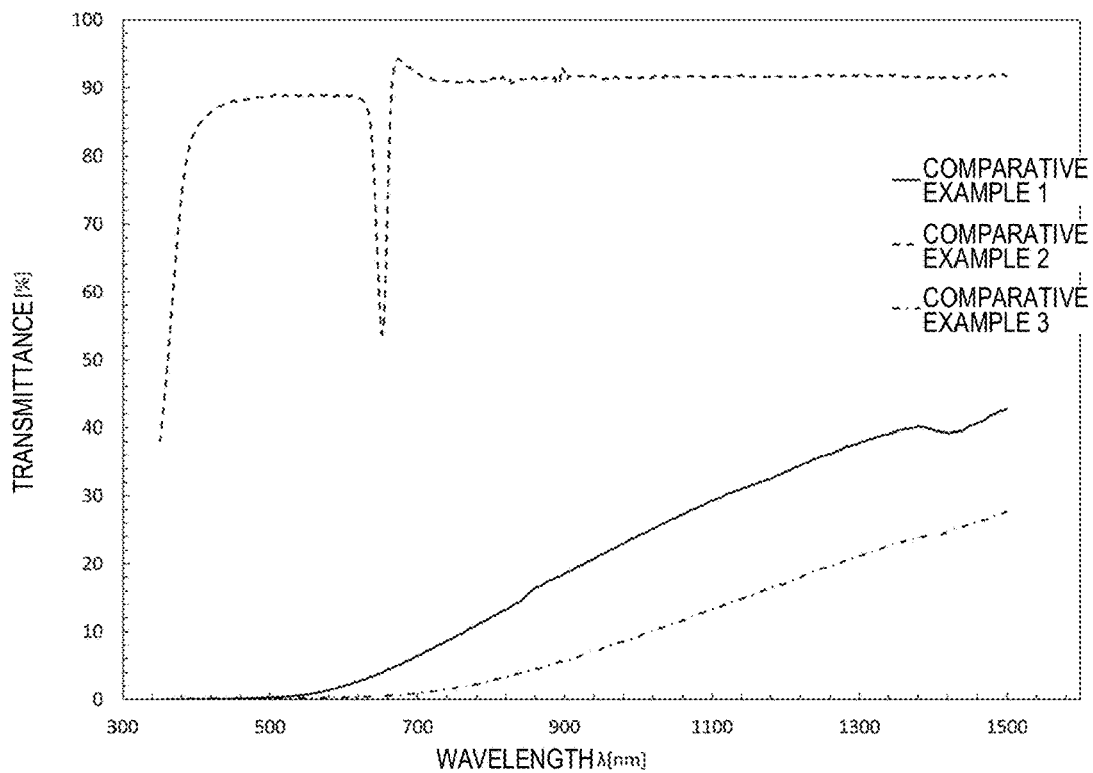
FIG. 18 shows regular transmittance spectra of the optical filters in comparative examples 1 through 3.

In comparative example 2, the Ds value is as large as 31.7. This is caused by Bragg reflection. Referring to FIG. 18, the regular transmittance spectrum in comparative example 2 has a steep dimple (drop in the transmittance) around 650 nm. This indicates that the light at this wavelength is reflected (Bragg-reflected). In each of example 7 (FIG. 16) and examples 16 and 17 (FIG. 17), the regular transmittance spectrum has a dimple in the visible light region. Unlike the spectrum in comparative example 2, in the case of the spectrum in each of example 7 (FIG. 16) and examples 16 and 17, the regular transmittance in the visible light region is relatively low, and the visible light of a wavelength shorter than the wavelength at which the dimple is seen is scattered rearward. It is considered that as a result of this, the influence of the Bragg reflection on the degree of whiteness of the rearward scattered light is relatively suppressed. It should be noted that in the case where Bragg reflection is caused, the optical filter is colored when being viewed at a particular angle. In order to cause the optical filter to appear white regardless of the angle at which the optical filter is viewed, it is preferred that the fine particles form a colloidal amorphous array.

Figure 20A:
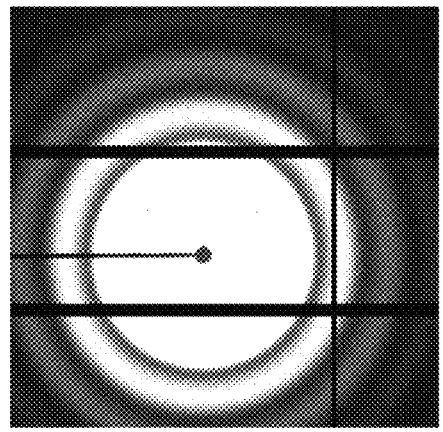
FIG. 20A shows a two-dimensional X-ray scattering pattern of the optical film in comparative example 3.
Figure 20B:
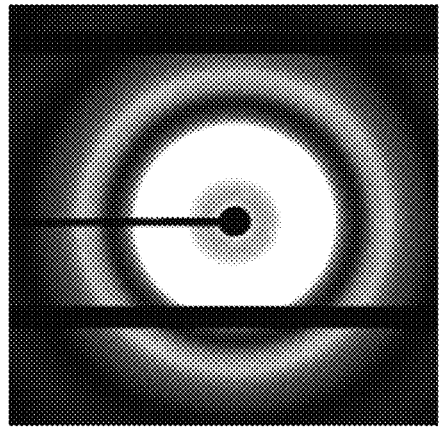
FIG. 20B shows a two-dimensional X-ray scattering pattern of the optical film in example 12.
Figure 20C:
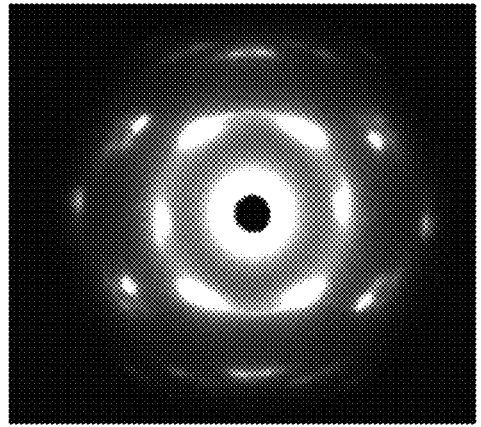
FIG. 20C shows a two-dimensional X-ray scattering pattern of the optical film in comparative example 4.

Now, with reference to FIG. 20A, FIG. 20B and FIG. 20C, the relationship between the two-dimensional pattern of the X-ray small angle scattering and the Ds value will be described. FIG. 20A shows the scattering pattern in comparative example 3 (the Ds value is 7.4). FIG. 20B shows the scattering pattern in example 12 (the Ds value is 11.0). FIG. 20C shows the scattering pattern in comparative example 4 (the Ds value is 37.7). It is seen that the scattering pattern in comparative example 3 shown in FIG. 20A is a very broad and isotropic halo (see FIG. 7 and FIG. 11). By contrast, the scattering pattern in comparative example 4 in FIG. 20C (photonic rubber) shows diffraction points at point-symmetrical positions. It is seen that the periodicity is high. The scattering pattern in example 12 in FIG. 20B shows no diffraction point. It is seen that the line width of the halo is narrower (see FIG. 5 and FIG. 9) than that of the scattering pattern in comparative example 3 in FIG. 20A. As can be seen, when the Ds value is large, the periodicity is high, whereas when the Ds value is small, the periodicity is low.

Figure 21:
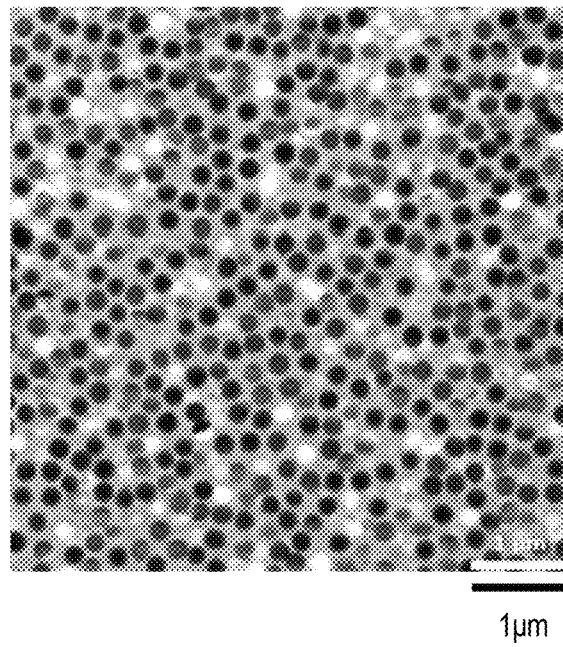
FIG. 21 shows a cross-sectional TEM image of an optical filter 10A in example 1.
Figure 22:
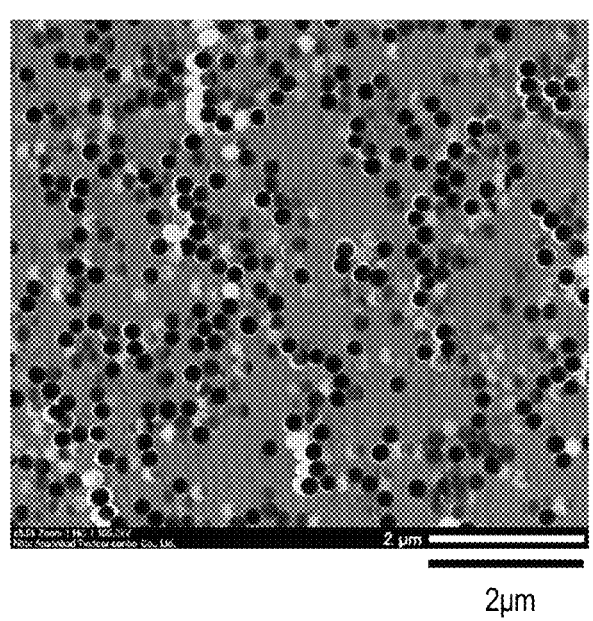
FIG. 22 shows a cross-sectional TEM image of an optical filter 20A in comparative example 1.

FIG. 21 shows a cross-sectional TEM image of an optical filter 10A in example 1, and FIG. 22 shows a cross-sectional TEM image of an optical filter 20A in comparative example 1. Samples for an observation with a TEM was obtained as follows. With the thickness of each of the films being d, the film was cut by a microtome along a plane at a position of d/2 to obtain a sample piece having a thickness same as the average particle diameter of the silica fine particles. In the TEM image in each of the figures, white circles are silica fine particles and black circles are sites from which the silica fine particles have been dropped.

It is seen that at the cross-section of the optical filter 10A shown in FIG. 21, the silica fine particles are dispersed almost uniformly; whereas at the cross-section of the optical filter 20A shown in FIG. 22, the silica fine particles are partially flocculated. A reason for this is that for producing the optical filter 20A in comparative example 1, polyethyleneglycol was incorporated as a flocculant in addition to acrylic monomer A. The flocculant was incorporated at a content of 0.1% by mass with respect to acrylic monomer A. It is considered that as a result of this, the Ds value in comparative example 1 is as small as 7.7 whereas the Ds value in example 1 is 10.3.

There is no significant difference between example 8, in which a dispersion assistant is incorporated, and example 7, in which no dispersion assistant is incorporated. It is considered that a sufficiently uniform dispersion is obtained even with no dispersion assistant as long as the fine particle fraction is 50% by mass (38% by volume) at most. As seen from a comparison between example 11, in which a dispersion assistant is incorporated, and example 10, in which no dispersion assistant is incorporated, the Ds value in example 11 with the dispersion assistant is smaller. This suggests that it is not easy to obtain a uniform dispersion state. From the above-mentioned results, it is considered that the Ds value may be a highly useful index that clearly reflects the difference in the dispersion state of the fine particles.

Figure 23:
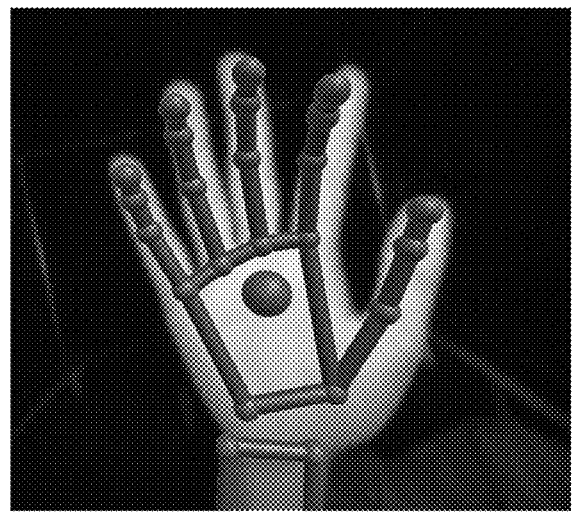
FIG. 23 is an example of camera image acquired by use of a motion capture device.
Figure 24:
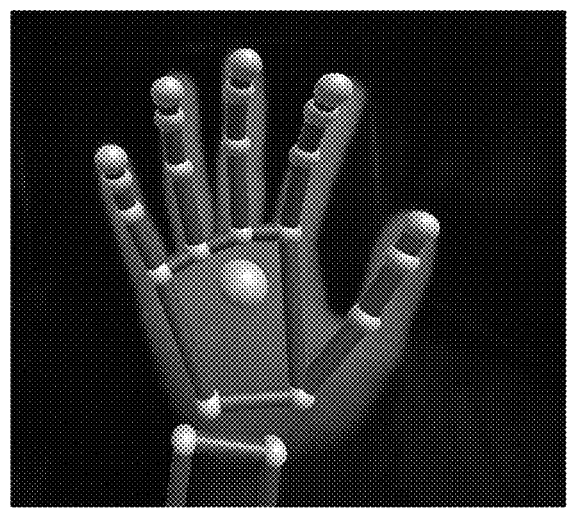
FIG. 24 is an example of camera image acquired by use of the motion capture device through the optical filter 10A in example 1.
Figure 25:
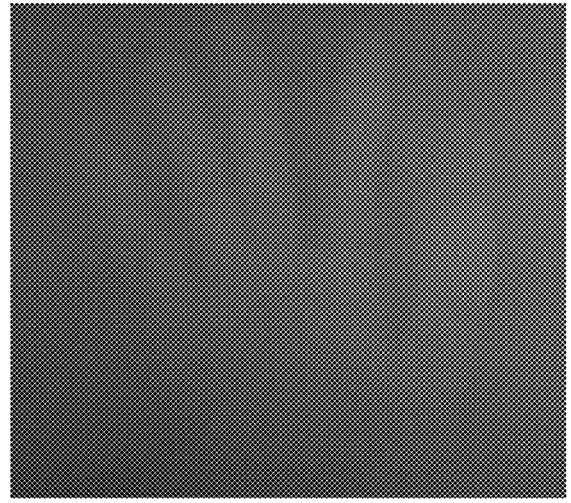
FIG. 25 is an example of camera image acquired by use of the motion capture device through the optical filter 20A in comparative example 1.

Now, with reference to FIG. 23, FIG. 24 and FIG. 25, results of a comparison between the optical filter 10A in example 1 and the optical filter 20A in comparative example 1 regarding the performance as an infrared filter will be described. FIG. 23 shows an example of camera image acquired by use of a motion capture device with no use of a filter. FIG. 24 shows an example of camera image acquired by use of the motion capture device through the optical filter 10A in example 1. FIG. 25 shows an example of camera image acquired by use of the motion capture device through the optical filter 20A in comparative example 1.

Herein, Leap Motion Controller (registered trademark) was used as the motion capture device, and a camera image of a hand located about 20 cm away from the motion capture device was acquired. The device uses infrared rays having a wavelength of 850 nm. As clearly seen from a comparison between FIG. 23, FIG. 24 and FIG. 25, the image acquired in the case where the optical filter 10A in example 1 is used (FIG. 24) is approximately as clear as the image acquired in the case where no filter is used (FIG. 23), whereas the image acquired in the case where the optical filter 20A in comparative example 1 is used (FIG. 25) is not clear and does not allow the hand to be recognized.

Figure 26:
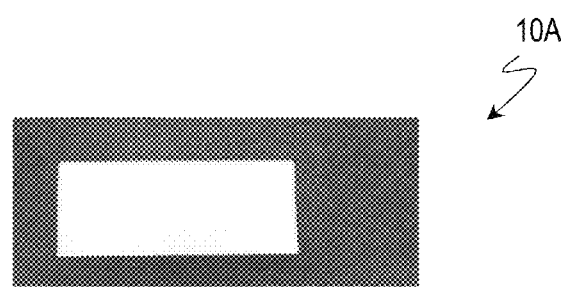
FIG. 26 shows an optical image of the optical filter 10A in example 1.
Figure 27:
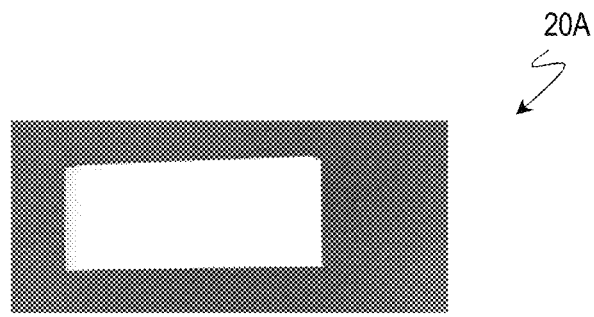
FIG. 27 shows an optical image of the optical filter 20A in comparative example 1.

FIG. 26 shows an optical image of the optical filter 10A in example 1, and FIG. 27 shows an optical image of the optical filter 20A in comparative example 1. The optical filter 10A in example 1 and the optical filter 20A in comparative example 1 are each a film having a size of about 5 cm×about 10 cm located so as to cover a front surface of the device. As seen from FIG. 26 and FIG. 27, both of the films exhibit a white color. Therefore, the optical filter 10A in example 1 is preferably usable as an infrared-transmissive filer and also has a high level of design quality because of the white color. Needless to say, a surface of the optical filter 10A in example 1 may be provided with a color or a pattern by printing or the like.

An optical filter according to an embodiment of the present invention may exhibit a white color as described above. Therefore, an optical filter having a variety of colors and a high level of design quality may be provided by using infrared-transmissive ink to print, for example, a letter, a pattern or a photograph on a surface of the optical filter. Namely, an optical filter according to an embodiment of the present invention may include an optical filter layer including a matrix and fine particles, and a printed layer located on the optical filter layer and formed of infrared-transmissive ink. The printed layer may be directly formed on a surface of the optical filter layer, or the printed layer formed on a surface of a transparent film may be located on the optical filter layer. As the infrared-transmissive ink, any type of known infrared-transmissive ink may be selected in accordance with the use or the wavelength of the infrared rays to be transmitted.

An optical filter according to an embodiment of the present invention, when being viewed obliquely, has the intensity of diffuse-reflected light increased, and therefore, has a white luminance increased and has the appearance of the design (visual recognizability of the design) improved.

An optical filter according to an embodiment may be a planar film as described above as an example, but may have any of various forms without being limited to this. An optical filter according to an embodiment may have a three-dimensional shape, and may be, for example, like a film having a three-dimensional shape. Specifically, for example, an optical filter may be formed on a surface of an object having a three-dimensional shape by use of a coating method. The surface of the object may have any shape, for example, may be a part of, or the entirety of, a sphere; a curved surface having any shape; a part of, or the entirety of, a surface of a polygonal object; or the like. It is preferred that the surface of the object does not scatter light.

Figure 28A:
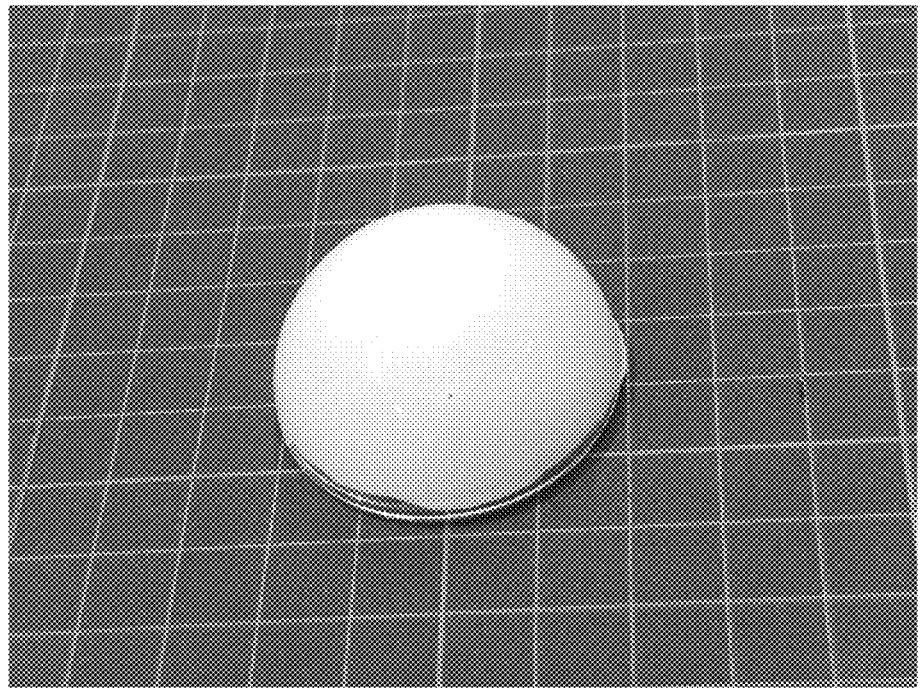
FIG. 28A shows an optical image (visible light) representing a semi-spherical optical filter in an example.
Figure 28B:
FIG. 28B shows an infrared image of the semi-spherical optical filter in the example shown in FIG. 28A.

For example, as shown in FIG. 28A and FIG. 28B, a semi-spherical optical filter may be formed. FIG. 28A shows an optical image (visible light) representing a semi-spherical optical filter in an example. FIG. 28B shows an infrared image of the semi-spherical optical filter in the example shown in FIG. 28A. The images shown in FIG. 28A and FIG. 28B are captured by use of a full hi-vision digital movie camera DVSA10FHDIR produced by Kenko Tokina Corporation. The image shown in FIG. 28A was captured under white LED illumination in a visible light mode. The image shown in FIG. 28B was captured in a dark room with only light from an infrared LED of the above-mentioned camera.

The optical filter shown in FIG. 28A and FIG. 28B has a thickness of 300 μm and was produced as follows. A surface of a semi-spherical object formed of an acrylic resin (PMMA) having a radius of 2 cm and a thickness of 1 mm was supplied with the same material as used in example 5 by dip coating. As shown in FIG. 28A, the filter is semi-spherical and is white. As shown in FIG. 28B, the filter transmits infrared rays.

An optical filter according to an embodiment of the present invention is usable for any of various uses in addition to a sensing device (e.g., infrared camera) described above as an example or a communication device, and is preferably usable for, for example, a solar cell, a heater using infrared rays or an optical power supply device using infrared rays.

INDUSTRIAL APPLICABILITY

An optical filter according to an embodiment of the present invention is usable as an infrared-transmissive filter usable for, for example, sensor technologies, communication technologies and the like.

REFERENCE SIGNS LIST 10, 10A, 20A optical filter
12 matrix
14 fine particles

The invention claimed is:

1. An optical filter, comprising:
a matrix and fine particles dispersed in the matrix,
wherein the fine particles have a parameter Ds that is not smaller than 8.0 and not larger than 30, the parameter Ds being given by Ds=$\lambda$/(B·cos θ·Ra) found from a USAXS pattern, where $\lambda$ is the wavelength of a X-ray, θ is half of the scattering angle 2θ (rad) giving the peak of the scattering intensity, B is the half width of the peak (FWHM, rad), and Ra is the average particle diameter of the fine particles,
wherein the fine particles form at least a colloidal amorphous array so as not to cause Bragg reflection, and
wherein the optical filter exhibits a white color.

2. The optical filter of claim 1, wherein the optical filter is configured such that a color exhibited in response to an application of standard light from a D65 light source has x and y coordinates in ranges of 0.25≤x≤0.40 and 0.25≤y≤0.40 on a CIE 1931 chromaticity diagram.

3. The optical filter of claim 1, wherein the optical filter has a value of L* measured by a specular component excluded (SCE) method of 20 or larger.

4. The optical filter of claim 1, wherein the optical filter has a regular transmittance of 60% or higher for light having a wavelength in at least a part of a wavelength range not shorter than 760 nm and not longer than 2000 nm.

5. The optical filter of claim 4, wherein the optical filter is configured such that the regular transmittance for light having a wavelength of 950 nm is 60% or higher.

6. The optical filter of claim 4, wherein the optical filter is configured such that the regular transmittance for light having a wavelength of 1500 nm is 60% or higher.

7. The optical filter of claim 1, wherein the fine particles include mono-dispersed first fine particles having an average particle diameter in a range not shorter than 80 nm and not longer than 300 nm.

8. The optical filter of claim 7, wherein the first fine particles have an average particle diameter of 150 nm or longer.

9. The optical filter of claim 1, wherein the fine particles has a volume fraction not lower than 6% and not higher than 60%.

10. The optical filter of claim 1, wherein where the matrix has a refractive index of nm and the fine particles have a refractive index of np, both for light having a wavelength of 546 nm, $|n_M - n_P|$ is not smaller than 0.03 and not larger than 0.6.

11. The optical filter of claim 1, wherein the optical filter has a three-dimensional shape.

12. The optical filter of claim 1, wherein the matrix is formed of a resin, and the fine particles are formed of an inorganic material.

13. A method for producing the optical filter of claim 12, the method comprising:
preparing a curable resin composition containing the fine particles dispersed and mixed in a curable resin;
providing a surface of a substrate with the curable resin composition, and
curing the curable resin contained in the curable resin composition provided on the surface.

14. The method of claim 13, wherein the providing is performed by a coating method.

15. The method of claim 14, wherein the providing is performed by a dip coating method.

16. An optical module, comprising:
a device including an infrared receiver; and
the optical filter of claim 1 located on a front surface of the infrared receiver of the device.

17. The optical module of claim 16, wherein the device is a sensing device, a communication device, a solar cell, a heater or a power supply device.

* * * * *